United States Patent [19]

Takemura et al.

[11] Patent Number: 5,114,760
[45] Date of Patent: May 19, 1992

[54] METHOD FOR MANUFACTURING LAYER-BUILT MATERIAL WITH SILICON DIOXIDE FILM CONTAINING ORGANIC COLORANT AND THE LAYER-BUILT MATERIAL MANUFACTURED THEREBY

[75] Inventors: Kazuo Takemura, Takarazuka; Juichi Ino, Nishinomiya; Hideo Kawahara, Mino; Masaki Kitaoka, Nishinomiya, all of Japan

[73] Assignee: Nippon Sheet Glass Co., Ltd., Osaka, Japan

[21] Appl. No.: 500,987

[22] Filed: Mar. 29, 1990

[30] Foreign Application Priority Data

| Apr. 1, 1989 | [JP] | Japan | 1-83816 |
| Jun. 29, 1989 | [JP] | Japan | 1-167366 |
| Jun. 29, 1989 | [JP] | Japan | 1-167367 |
| Jun. 29, 1989 | [JP] | Japan | 1-167368 |
| Aug. 7, 1989 | [JP] | Japan | 1-204214 |
| Aug. 23, 1989 | [JP] | Japan | 1-217124 |
| Aug. 24, 1989 | [JP] | Japan | 1-218054 |
| Sep. 5, 1989 | [JP] | Japan | 1-229694 |
| Sep. 13, 1989 | [JP] | Japan | 1-238295 |
| Sep. 13, 1989 | [JP] | Japan | 1-238296 |

[51] Int. Cl.$^5$ ............................................. B05D 1/8
[52] U.S. Cl. .......................... 427/430.1; 8/495; 427/443.2; 428/412; 428/409; 428/428; 359/884; 359/350; 359/885
[58] Field of Search ............ 350/1.5, 311, 312, 600; 427/430.1, 443.2; 428/1, 403, 412, 409, 428; 8/495

[56] References Cited

U.S. PATENT DOCUMENTS

| 2,505,629 | 4/1950 | Thomsen | 117/124 |
| 4,300,143 | 11/1981 | Bell et al. | 346/135.1 |

FOREIGN PATENT DOCUMENTS

| 57-196744 | 12/1982 | Japan . |
| 137217 | 7/1985 | Japan . |
| 60-176947 | 9/1985 | Japan . |
| 61-281047 | 12/1986 | Japan . |
| 63-151623 | 6/1988 | Japan . |
| 63-151624 | 6/1988 | Japan . |
| 63-195109 | 8/1988 | Japan . |
| 626810 | 7/1949 | United Kingdom . |
| 2018621A | 10/1979 | United Kingdom . |

OTHER PUBLICATIONS

Journal of Ceramics 21, Two (1986), pp. 111-118.
Journal of Industrial Material, vol 37, No. 4, (Mar. 1989), pp. 50-55.

Primary Examiner—Michael Lusignan
Attorney, Agent, or Firm—Armstrong, Nikaido, Marmelstein, Kubovcik & Murray

[57] ABSTRACT

A method for forming a silicon dioxide film according to the present invention comprises steps of: (i) contacting a substrate with processing solution containing silicofluoric acid solution supersaturated with silicon dioxide, and (ii) forming the silicon dioxide film on the substrate; wherein organic colorant(s) is/are introduced into the silicon dioxide film by adding organic colorant(s) to the processing solution. According to the present invention, a silicon dioxide film containing organic colorant without defect such as air bubbles, or undecomposed raw material.

21 Claims, 4 Drawing Sheets

METHOD FOR MANUFACTURING LAYER-BUILT MATERIAL WITH SILICON DIOXIDE FILM CONTAINING ORGANIC COLORANT AND THE LAYER-BUILT MATERIAL MANUFACTURED THEREBY

BACKGROUND OF THE INVENTION

The present invention relates to a method of manufacturing a layer-built material in which a silicon dioxide film containing an organic colorant is formed on a substrate, and to the layer-built material manufactured thereby.

As a means for acquiring a material having new functional feature, it is already attempted to introduce an organic colorant to a silicon dioxide film. However, organic colorants are easily decomposed when being exposed to high temperatures and, therefore, a so-called sol-gel method is the only method conventionally practiced for producing such material featuring new functional characteristic. Typically a technical paper "J. Non-Crys. Solids, 74 (1985), 395" refers to this method in which a fluorescent organic colorant is introduced to silicon dioxide film. This prior art reports to have merely produced a porous film containing organic colorant. Another technical paper "Ceramics, 21, No. 2, 1986, 111" proposes the doping of organic molecules into non-crystal quartz by sol-gel method. It is reported that residual impurities, distortion, defects and the like are present in the structure of the produced glass.

Any of those prior arts use the sol-gel method, and as a result, in order to securely fix the film to the substrate, heating must be executed in the final stage of the production process. However, since the film on the substrate cannot be heated at such a high temperature as causing the organic colorant to decompose, the resultant film unavoidably becomes porous. Furthermore, organic colorants easily decomposable by heating at a low temperature cannot be used in this method. Heating which is obliged to conduct at a low temperature raises further problems inherent to the sol-gel method, for example, generation of residual impurities in the structure of film such as some amounts of undecomposed raw material and organic solvent. These prior arts cited above commonly involves another problem of expensive cost of film because expensive metal alkoxide is used as the starting material. Furthermore, dip-coating employed by those prior arts cannot effectively be applied to substrates having complex form.

The primary object of the invention is to provide a novel method of manufacturing a silicon dioxide film containing an organic colorant which is perfectly free from those defects inherent to any conventional method of manufacturing silicon dioxide film containing organic colorant.

The term "organic colorant" as used herein means a concept broad enough to include those capable of developing color by any effective treatment.

The first embodiment of the invention relates to a method of dyeing a molded organic material. More particularly, it relates to a method of forming a colored layer featuring surpassing chemical and mechanical durability on the surface of molded organic material shaped in those forms such as plane sheet, film, rod, tube, sphere, fiber, web, and a variety of processed forms.

Conventionally, the molded organic material is colored merely by adding colorant to the organic material in the course of synthesizing the moldable material. For example, when coloring moldable resin, any of those colorants such as inorganic pigment, or organic pigment, or dyestuff, is blended with resin, and then pasted, uniformly dispersed in the resin, which is then polymerized and cured before eventually being molded. However, the method of blending colorant with moldable organic material is subject to restriction against molding temperature of resin, polymerizing and curing condition, and crosslinking condition caused by weak heat resistivity of the organic colorant and has a problem against the weatherability in exposure to air and water. In addition, there is a certain limit caused by inability to locally color on the moldable object.

To dispose of those problems, in addition to the method of blending colorant with moldable organic material mentioned above, conventionally, either printing or dyeing process is used for coloring on the surface of the moldable organic material. Printing is performed by causing color ink composed of either inorganic pigment, or organic pigment, or dyestuff, to be absorbed into the moldable organic material. Printing process locally colors the molded substrate, and in addition, there are a variety of kinds of colors available for coloring the molded substrate. However, adhesive strength of colorant contained in ink for molded substrate having smooth surface is weak, so that ink film often exfoliates. Furthermore, since the surface of molded substrate does not absorb ink vehicle, it is necessary that vaporization of organic solvent is promoted by heating. Nevertheless, since heating process at a high temperature cannot be applied, organic solvent may remain on the printed surface to result in the occurrence of odor and blocking (i.e., adhesion of the printed substrates).

On the other hand, dyeing is mainly used for coloring fibers by causing colorant mainly consisting of dyestuff to be absorbed into fibers. In case of dyeing fibers, in order to promote the bonding force between dyestuff and fibers, it is necessary to carefully select dyestuff, auxiliary agents, and paragenic ion and the like in accordance with fibers, so that dyeing process becomes extremely complex.

Furthermore, printing and dyeing have common problems. Colorant is directly exposed to external atmosphere, and as a result, oxygen and moisture in atmosphere easily causes oxidation and hydrolysis to occur. In addition, rendering symptom may also be generated due to presence of water, organic solvent, and a variety of chemicals. Also, dyed fibers may mechanically be worn or damaged, so that local degradation of the colored effect or local discoloration often occurs.

The primary object of the first embodiment of the invention is to fully eliminate those defects inherent to the printing and dyeing processes mentioned above by providing an improved coloring or dyeing method which is capable of securely forming a colored layer on the surface of the molded organic substrate and features surpassing chemical and mechanical durability.

More particularly, the invented method dispenses with the condition of causing the colorant to be exposed to the external atmosphere directly while either the printing or the dyeing is underway, and the invented method prevents the colorant from reacting water and organic solvent by virtue of the protective effect of silicon dioxide film, thus securely promoting the weatherability of the colored layer. Furthermore, by virtue of surpassing durability of silicon dioxide against wear, the durability against mechanical wear is also promoted. Since the improved method of the first embodiment of invention provides organic silicon compound (coupling agent) between silicon dioxide containing colorant and the molded organic substrate, the bonding force between the colored layer and the molded organic substrate is intensified.

As is clear from the above description, the object of the first embodiment of the invention is to provide a colored layer which has extremely intense bonding force on the surface of the molded organic substrate and the chemically and mechanically stable resistivity by initially forming a film of organic silicon compound (coupling agent) before eventually generating silicon dioxide film containing colorant.

The second embodiment of the invention relates to a method of coloring acrylic resin molded substrate. More particularly, it relates to a method of forming a chemically and mechanically durable colored layer on the surface of the molded acrylic resin shaped in those forms such as plane sheet, film sheet, rod, tube, sphere, fiber, web, and a variety of processed forms.

Conventionally, colorant is added to the molded acrylic resin in the course of synthesizing the moldable material. For example, when coloring molded resinous material, any of those coloring agents such as inorganic pigment or organic pigment, or dyestuff, is blended with resin, which is then pasted, and then uniformly dispersed in the resin material, which is then polymerized and cured before eventually being molded. However, the method of blending colorant with moldable acrylic resin is subject to restriction against molding temperature of resin, polymerizing and curing condition and crosslinking condition caused by weak heat resistivity of the organic colorant, and has a problem against the weatherability in exposure to air and water. In addition, there is a certain limit when using colorant caused by inability to locally develop color on the moldable material.

To dispose of those problems, in addition to the method of blending colorant with moldable acrylic resin mentioned above, conventionally, either printing or dyeing process is widely used for coloring on the surface of the moldable acrylic resin. Printing is performed by causing color ink composed of either inorganic pigment or organic pigment, or dyestuff, to be absorbed into the moldable organic material surface. Printing allows the molded substrate to be colored locally, and in addition, there are a variety of kinds of colors available for coloring. However, adhesive strength of colorant contained in ink for molded substrate having smooth surface is weak, so that ink film often exfoliates. Furthermore, since the surface of the molded resin does not absorb ink vehicle, it is necessary that vapourization of solvent is promoted by the heating. Nevertheless, since the heating process at a high temperature cannot be applied, organic solvent may remain oh the printed surface to result in the occurrence of odor and blocking (i.e., adhesion of the printed substrates).

On the other hand, dyeing is mainly used for coloring fibers by causing colorant mainly consisting of dyestuff to be absorbed into fibers. When dyeing fibers, in order to promote the bonding force between dyestuff and fibers, it is necessary to carefully select dyestuff, auxiliary agents, and paragenic ion, and the like in accordance with fibers, so that dyeing process becomes extremely complex.

Furthermore, printing and dyeing have common problems. Colorant is directly exposed to external atmosphere, and as a result, oxygen and moisture in atmosphere easily causes oxidation and hydrolysis to occur. In addition, rendering symptom may also be generated due to presence of water, organic solvent, and a variety of chemicals. Also, dyed fibers may mechanically be worn or damaged, so that local degradation of the colored effect or local discoloration often occur.

The object of the second embodiment of the invention is to fully eliminate those defects inherent to the printing and dyeing processes mentioned above by providing an improved coloring or dyeing method which is capable of securely forming colored layer on the surface of molded acrylic resin and features surpassing chemical and mechanical durability.

More particularly, the invented method dispenses with the condition of causing the colorant to be exposed to the external atmosphere directly while either the printing or the dyeing process is underway, and the invented method prevents the colorant from reacting water and organic solvent by virtue of the protective effect of silicon dioxide film, thus securely promoting the weatherability of the colored layer. Furthermore, by virtue of surpassing durability of silicon dioxide against wear, the durability against mechanical wear is also promoted. Since the improved method provides organic silicon compound (coupling agent) between silicon dioxide containing colorant and the molded acrylic resin, the bonding force between the colored layer and the molded acrylic resin is intensified.

As is clear from the above description, the object of the second embodiment of the invention is to provide a colored layer which has extremely intense bonding force on the surface of the molded acrylic resin and the chemically and mechanically stable resistivity against wear by initially forming a film of organic silicon compound (coupling agent) before eventually generating silicon dioxide film containing colorant.

The third embodiment of the invention relates to a method of coloring polycarbonate resin molded substrates. More particularly, it relates to the method of forming a chemically and mechanically durable colored layer on the surface of the molded polycarbonate resin shaped in those forms like plane sheet, film, rod, tube, sphere, fiber, web, and a variety of processed forms.

Conventionally, colorant is added to the molded polycarbonate resin in the course of synthesizing the moldable material. For example, when coloring molded resinous material, any of those coloring agents like inorganic pigment or organic pigment, or dyestuff, is blended with resin, which is then pasted, and then uniformly dispersed in the resin material, which is then polymerized and cured before eventually being molded. However, the method of blending colorant with moldable polycarbonate resin is subject to restriction against molding temperature of resin, polymerizing and curing condition, and crosslinking condition caused by weak heat resistivity of the organic colorant, and has a problem against the weatherability in exposure to air and water. In addition, there is a certain limit when using colorant caused by inability to locally develop color on the moldable material.

To dispose of those problems, in addition to the method of blending colorant with moldable polycarbonate resin mentioned above, conventionally, either printing or dyeing process is widely used for developing color on the surface of the moldable polycarbonate resin. Printing is performed by causing color ink composed of either inorganic pigment, organic pigment, or dyestuff, to be absorbed into the moldable organic material surface. Printing allows the molded substrate to be colored locally, and in addition, there are a variety of kinds of colors available for coloring. However, adhesion strength of colorant contained in ink for mold substrate having smooth surface is weak, so that ink film often exfoliates. Furthermore, since the surface of the molded resin does not absorb ink vehicle, it is necessary that vapourization of solvent be promoted by the heating. Nevertheless, since the heating process at a high temperature cannot be applied, organic solvent may remain on the printed surface to result in the occurrence of odor and blocking (i.e., adhesion of the printed substrates).

On the other hand, dyeing is mainly used for coloring fibers by causing colorant mainly consisting of dyestuff to be absorbed into fibers. When dyeing fibers, in order to promote the bonding force between dyestuff and fibers, it is necessary to carefully select dyestuff, auxiliary agents, and paragenic ion, and the like in accordance with fibers, so that dyeing process becomes extremely complex.

Furthermore, printing and dyeing have common problems. Colorant is directly exposed to external atmosphere, and as a result, oxygen and moisture in atmosphere easily causes oxidation and hydrolysis to occur. In addition, rendering symptom may also be generated due to presence of water, organic solvent, and a variety of chemicals. Also, dyed fibers may mechanically be worn or damaged, so that local degradation of the colored effect or local discoloration often occurs.

The object of the third embodiment of the invention is to fully eliminate those defects inherent to the printing and dyeing processes mentioned above by providing an improved coloring or dyeing method which is capable of securely forming colored layer on the surface of molded polycarbonate resin and features surpassing chemical and mechanical durability.

More particularly, the invented method dispenses with the condition of causing the colorant to be exposed to the external atmosphere directly while either the printing or the dyeing is underway, and the invented method prevents the colorant from reacting water and organic solvent by virtue of the protective effect of silicon dioxide film, thus securely promoting the weatherability of the colored layer. Furthermore, by virtue of surpassing durability of silicon dioxide against wear, the durability against mechanical wear is also promoted. Since the improved method of the third embodiment of the invention provides organic silicon compound (coupling agent) between silicon dioxide containing colorant and the molded polycarbonate resin, the bonding force between the colored layer and the molded polycarbonate resin is intensified.

As is clear from the above description, the object of the third embodiment of the invention is to provide a colored layer which has extremely intense bonding force on the surface of the molded polycarbonate resin and the chemically and mechanically stable resistivity against wear by initially forming a film of organic silicon compound (coupling agent) before eventually generating silicon dioxide film containing colorant.

The fourth embodiment of the invention relates to coloring pigments which form a colored layer on the surface of pulverulent body. More particularly, it relates to a coloring pigments which form silicon dioxide film containing organic colorant on the surface of pulverulent body and features surpassing chemical and mechanical durability.

Today, important role of pigment sharply increases as versatile colorant for the production of paint, printing ink, cosmetics, synthetic resin, and conventional goods in a variety of fields.

Pigment consists of inorganic pigment made from inorganic material and organic pigment made from organic material. Most of inorganic pigments are chemically stable and harmless, which are extensively used for the production of paint, printing ink, cosmetics, and construction materials.

On the other hand, only limited kinds of inorganic pigments are available today. In particular, the inorganic pigment lacks in the color brilliancy. As a result, in many cases, organic pigments are unavoidably used for the production of those fields of goods critically requiring color characteristic, for example, makeup cosmetics including lip stick and nail enamel for the point makeup, or image printing ink. Although organic pigments feature a wide variety of the kinds of color and brilliancy of color, majority of them are based on tarry ingredient. Because of potential hazard against human health like skin disease, carcinogenic potential, or mutation, strict regulation is legally applied to the use of organic pigments. And therefore, there is substantial restriction over the use of organic pigments today.

To deal with those problems cited above, a wide variety of attempts such as coating the surface of organic pigment completely with inorganic material and sealing organic pigment inside of extremely fine inorganic capsules were tried. Nevertheless, in strict sense, such protective layer made from inorganic material consists of crusted structure composed of porous or extremely fine colloid, so that the protective layer cited above cannot fully prevent organic pigment from coming into contact with water, solvent, and oxygen.

More particularly, there is no practical means to safely materialize such chemically stable pigments featuring a wide variety of available colors and color brilliancy.

The object of the fourth embodiment of the invention is to fully solve those problems inherent to conventional coloring pigments by forming silicon dioxide film containing organic colorant all over the surface of inorganic or organic pulverulent body so that stability and safety of this film comparable to those of inorganic pigments can be achieved while securing abundant kinds and brilliancy of colors characteristic of organic pigments.

The fifth embodiment of the invention relates to a color filter necessary for a light-receptive display device like liquid crystal display (LCD). More particularly, it relates to a color filter which features surpassing chemical and mechanical durability and is provided with the color layers of red, green, and blue composed of silicon dioxide film containing organic colorant.

As a result of significant development achieved in the information/communication fields, display device shares extremely important roles. Accordingly, there are a variety of sophisticated demands on the display technique to materialize light weight, slim structure, wider area, coloration, and finer image for the display device. In particular, there is a growing expectation on the LCD which has achieved significant technological progress in late years. Above all, there is an ardent expectation on the liquid crystal color display like a color TV for example. To suffice the demand, a variety of arts related to the color liquid crystal display have already been proposed.

Today, majority of the colored liquid crystal display devices incorporate color filters which at regular intervals set fine color layers of red (R), green (G), and blue (B) in the order of RGB, RGB .... In order to select any of these RGB colors at a specific display position, shutter function of liquid crystals operating in correspondence with extremely fine areas of the RGB colors is used.

At present, some methods have been tried for the production of the color filter cited above. One of these methods directly coats the three-color inks over the surface of glass by applying the offset or screen printing process for each color for three rounds. Despite of simple process, precision of the printed pattern is critical problem. Furthermore, ink thickness becomes thick in the portion where these three-color inks are superimposed. As a result, the ink surface easily generates concaves and convexes. To level off the surface, leveling operation is necessary. Normally, surface smoothening operation is necessarily performed by coating, for example, polyimide resin film over the surface coated with R, G, and B inks. Conventionally, printing ink is composed of the blend of organic solvent like "cellosolve" and colorant like organic colorant and pigment. Also, leveling agent is composed of organic material. After completing the smoothening operation, transparent electrodes composed of indium oxide/zinc indium (ITO), film, for example, are provided under vacuum condition. While forming this film, organic material arises problems such as long time pressure reduction operation caused by discharge gas from the material, and difficulty of obtaining satisfactory ITO film. To dispose of this problem, there is another method which initially forms silicon dioxide film on the surface of the leveling agent by applying sputtering process before eventually generating the ITO film.

The secondary method coats photopolymer containing organic colorant over the ink surface by applying photoresist process. For example, ink surface is initially masked by the photoresist process except for the red-ink portion, and then, photopolymer containing red colorant is coated over the red segment, and finally, photopolymer is optically cured before a red filter is eventually formed. Next, masking agent is removed, and then, by repeating those sequential processes against the green and blue segments as is done for the red segment before a color filter is eventually produced.

The above method involves a number of processes because delicate operation like the photoresist process must be performed repeatedly with much care. On the other hand, advantage of this method is that extremely precise pattern is obtained. However, even when applying this method with the photoresist process, the surface of the colorant applied to the red, green, and blue components becomes unlevel to a certain extent, so that, after executing this method, the leveling process is required. Furthermore, as was done for the printing process, since the photopolymer and the leveling agent are respectively composed of organic material, after completing the leveling process, it is necessary that silicon dioxide film is formed in the final stage.

The third method preliminarily forms patterned ITO film on the transparent substrate in correspondence with the red, green and blue components, and then immerses the substrate in aqueous solution containing dispersed organic pigments. Next, DC voltage is supplied between opposite electrodes like graphite electrodes and the red segment on the surface of the substrate in the aqueous solution to allow only the red organic pigment (having colloidal electric charge in this solution) to be laid on the surface of the red segment. Next, green organic pigment is laid on the surface of the ITO film of green segment by supplying DC voltage between those opposite electrodes and the ITO film of the green segment in aqueous solution containing dispersed green organic pigment. These serial processes are also executed against the blue segment Even in this method, after completing those sequential processes mentioned above, it is necessary that the leveling process is performed before eventually forming the silicon dioxide film as was done for the first and second methods mentioned earlier.

As is clear from the above description, any of those methods attempted needs to individually perform coating processes for the red, green, and blue segments, and yet, since the leveling process for leveling uneven thickness of film after completing the coating process solely uses organic material like organic colorant and organic leveling agent, any of those methods cited the above needs to form silicon dioxide film in order to restrain discharge of gas in presence of vaccum. Above all, too many steps and the complexity of these processes are critical problems to solve for reducing the production cost. Thus, an early renovation of these methods cited the above is urged today.

The fifth embodiment of the invention has been achieved to fully solve those problems related to color filters. The object of the fifth embodiment of the invention is to dispense with the process for forming silicon dioxide film thus far needed for restraining discharge of gas under vacuum condition and also eliminate the leveling process by providing a novel means for forming silicon dioxide film containing organic colorant.

The sixth embodiment of the invention relates to a colored mirror composed of a colored layer which is formed on the surface of a transparent substrate. More particularly, it relates to a colored mirror featuring surpassing durability against chemical and mechanical wear, where the colored mirror is composed of silicon dioxide film containing organic colorant on the surface of a transparent substrate.

From those old days, there is a constant demand for such a colored mirror to enhance the decorative effect. Recently, there is an idea of applying the colored mirror to the filter mirror by availing of the effect of the increase and decrease of reflection rate in the specific wave length band shown in the spectrum of the colored mirror.

When using the colored mirror for decorative purpose, coloration is performed by either coloring the transparent substrate itself or forming the colored layer on the transparent substrate. In the method, basically, coloration of the transparent substrate is performed by blending colorant with the substrate material, although there is difference in the colored effect depending on the kinds of material available for the substrate. For example, trial coloration of glass substrate was executed by blending inorganic colorant with the substrate material while the glass production process was underway. Also, trial coloration of plastic substrate was executed by blending colorant such as organic dyestuff or organic pigment with resinous material while the plastic molding process was underway.

Nevertheless, there were a variety of restrictive factors in the coloration of glass substrate using inorganic colorant, where the restrictive factors were found in the limited kinds of colors for use, absence of color brilliancy, inability of coloration against part of the substrate, etc. On the other hand, although there are a wide variety of colors having satisfactory brilliancy available for coloring resinous material containing organic colorant, the colored plastic substrate still has problem common to organic materials, where the problem is found in the shortage of chemical durability against water and oxygen which respectively infiltrate into the plastic substrate, shortage of physical durability against ultraviolet rays, and inability to implement local decoration. As a result, like the coloration of glass substrate, there is substantial restriction over the application of the method of coloring plastic substrate.

To dispose of this problem, a method of forming metallic film over the colored layer preliminarily formed on the surface of the transparent substrate has widely been introduced. Although this method allows local coloration, like the case of coloring the glass substrate mentioned above, there is a certain limit in the kinds and brilliancy of available colors. (When producing glass substrate, generally, colored layer is formed with inorganic colorant like the case of providing colored luster.) As a result, trials are still underway for forming organic colored layer over the surface of plastic substrate. Nevertheless, since organic colorant is present in the surface layer of plastic substrate, durability and weatherability are more critical problems than the coloration of the plastic substrate itself.

Furthermore, the filter mirror generally requires not less than three layers, so that it arises such problems as difficulty of applying to large scale substrates because of troublesome film thickness control and high production cost brought by many production steps.

The sixth embodiment of the invention has been achieved to fully solve those problems related to the conventional colored mirrors. The object of the sixth embodiment of the invention is to provide a novel colored mirror featuring extremely high durability and weatherability, availability of a wide variety of colors, brilliancy of colors, and the local coloration capability, by providing novel silicon dioxide film containing organic colorant on the surface of transparent substrate.

The seventh embodiment of the invention relates to a glass composed of colored layer coated on a glass substrate having unlevel surface. More particularly, it relates to a colored glass having enhanced decorative function by forming novel silicon dioxide film containing organic colorant on the unlevel surface of the glass substrate.

In order to promote decorative function of glass, template glass having figurative patterned unlevel surface has been used since old days. Furthermore, in order to promote glare-proof effect and restrain transparency of glass, an art of roughing the glass surface has widely been made available. For example, ground glass having the surface ground with a metallic brush is exemplified. In addition, there is such an art of roughing the glass surface by applying sand-blast process and an art of etching the glass surface by applying a sort of hydrofluoric acid solution. In this way, glass having unlevel surface is widely used for a variety of purposes like for decoration, restraining transparency, and for achieving glare-proof effect.

Recently, a variety of trials are actively carried on to promote decorative effect and appearance by coloring those kinds of glass mentioned above so that more comfortable living space can be materialized. Mainly, two methods are experimentally performed to color glass having unlevel surface. One is an art which varies the composition of glass before being colored. For example, oxide composed of transition metal like cobalt, nickel, iron, or chrome, is added to glass material so that the glass material can be colored by the ionized effect of those metallic elements mentioned the above. While the colored glass material still remains in the softened state during molding, a pattern on the glass surface is engraved using a roll bearing figurative unlevel pattern before eventually producing template glass. Nevertheless, only those cold colors including blue, green, yellow, and gray can be used for developing color when applying the above method. Furthermore, there are only limited kinds of colors available for this method. Above all, since glass material containing colorant is dissolved in the glass furnace, this method is not suited for producing a variety of kinds of colored glass in small production lots. To dispose of these problems, another method was tried for forming transparent layer on unlevel surface of glass. A thermal discomposition method, as is typically represented by luster for example, wherein the glass initially coated with organic solvent solution containing organic metal compound and precious metal compound, and then applied heat treatment between 450° C. and 550° C. A still another method was also attempted by initially coating paste containing precious metal compound of gold, silver, and copper on the plane glass, followed by thermal treatment between 500° C. and 600° C., and impregnation of precious metal elements into glass by ion-exchange process before eventually developing color.

Any of those methods cited above utilizes color development of metallic colloid. Thermal decomposition method causes precious metal colloid to be generated in metal oxide, whereas ion-exchange method causes precious metal colloid to be generated on the glass surface layer. Nevertheless, any of these methods merely uses limited kinds of colors effective for development, and yet, only those cold colors cited above are applicable. Above all, a critical problem of any of these methods like spraying or immersing process is that colored layer having uniform thickness cannot be formed because of the unlevel glass surface. In other words, any of these methods cannot practically be used because the colored effect is significantly uneven.

The seventh embodiment of the invention has been achieved to fully solve those problems inherent to the art of colored glass having unlevel surface. The object of the seventh embodiment of the invention is to provide such colored glass free from those problems mentioned the above, where the colored glass provided by the seventh embodiment of the invention has chemically and mechanically stable colored layer by applying a wide variety of available colors and brilliancy of these colors characteristic of organic colorant by allowing novel silicon dioxide film containing organic colorant to stably be formed on the glass surface.

The eighth embodiment of the invention relates to metallic substrate which is complete with coloration process. More particularly, it relates to such metallic substrate which is provided with colored layer featuring surpassing durability and decorative effect by forming novel silicon dioxide film containing organic colorant on its surface.

To enhance decorative effect of any metallic substrate, conventionally, colored layer has been formed on its surface since old days. For example, the chemical coloration process represented by the black-dyeing method immerses the metallic substrate in aqueous solution containing potassium sulfide or potassium persulfate for sulfuration or oxidation of the metallic surface so that the blackening characteristic of the sulfurated or oxidized layer can be used. This method is applicable to such metallic substance like copper, iron, and aluminium. However, this method is not always widely applicable, and yet, only black is available for development. To compensate for this, anode oxidation method is widely applied today, which is effective for such metal like stainless steel that cannot be colored merely by applying chemical coloration process. Anode treatment of aluminium is the typical example of the anode oxidation method, where aluminium can be colored by contacting the aluminium with solvent containing organic dyestuff, although the oxidized layer formed is porous and colorless.

In addition, although porous colored layer can be formed on the surface of metallic substrate by treatment with phosphate or chromate, only limited number of the kinds of color are applicable, and therefore, only organic dyestuffs are unavoidably used. However, coloring the metal substrate with porous layer, containing colorant, formed by anode oxidation process or chemical treatment has drawbacks:

most of the formed layers are opaque so that metal surface becomes invisible;

coloring process is complex since sealing process for pinholes is required after impregnating these pinholes with dyestuff; and dyestuffs are easily disgraded and discolored by water infiltrating through sealing wall. In addition, metallic substrates which can be applied to by the above-mentioned treatment are limited. As a result, it is difficult to adopt the above-mentioned method as a universal method.

To replace those methods cited above, another method was also tried. This method colors the metal surface by generating eutectoid of metallic particles and molecules of organic and inorganic pigments by applying dispersion plating process. Also in this case, there is a restriction in practical application since the coated layer becomes too thick for the metal surface to be seen, and insufficient acidproof of the eutoctoid-applied metallic particle.

As mentioned above, although it was the important target for the concerned to properly coat the metal surface with optional colors during the past years, actually, there was no art that could satisfy this requirement because of a variety of problems in the kinds of available colors, kinds of usable metals, and the durability of colored layer.

The object of the eighth embodiment of the invention is to provide novel metallic substrate which fully solves those problems found in any of these prior arts.

The ninth embodiment of the invention relates to a glass covering clocks and/or wrist watches. More particularly, it relates to a colored glass covering clocks and/or wrist watches, which features provision of sufficiently strengthened glass covering with transparent layer on the surface.

To enhance decorative function of clocks and wrist watches, a variety of trials were carried out for coloring the covering glass since old days. One of these methods is to blend the glass material with oxide of transition metal like cobalt, nickel, iron, and chrome so that glass material can be colored by ionized effect of these metallic elements. Nevertheless, this method can merely use those limited kinds of cold colors including blue, green, yellow, and gray for development, and yet, there are only limited kinds of colors available for this method. In particular, since glass material containing colorant is dissolved in the glass furnace, this method is not suited for producing a variety of kinds of clock/watch covering glass in small production lots. To dispose of this problem, another method was tried, in which initially transparent colored layer on plane glass was formed, and then, thermal treatment was applied before eventually performing molding process. To form a colored layer, as typically shown by luster, thermal decomposition method wherein a plane glass is coated with organic solvent solution containing organic metal compound and precious metal compound, and then they are applied with thermal treatment between 450° C. and 550° C. Another method was also tried, which initially coated the plane glass with paste containing precious metal compound like gold, silver, or copper, and then it was applied with thermal treatment between 500° C. and 600° C., and then precious metal element was impregnated into the glass by applying ion-exchange process before eventually developing color.

Any of those preceding methods effectively uses color development of metallic colloid. The thermal decomposition method allows generation of precious metal colloid in metal oxide, whereas the ion-exchange method allows generation of precious metal colloid in the glass surface layer. Nevertheless, when applying either of these methods, only limited kinds of colors are available for the color development, and yet, only those cold colors cited above are available. In particular, any of these preceding methods has a critical problem, that is, chemical strengthening for covering glass cannot be applied to those method.

More particularly, when executing any of those methods cited above, the covering glass is chemically strengthened by being immersed in the heated nitrate solution containing $K^+$ so that $Na^+$ can be exchanged with $K^+$ in the nitrate solution. However, the colored layer which was colored by preliminarily applying either the thermal decomposition method or the ion-exchange method against the glass surface disturbed the transfer of the $Na^+$ and $K^+$, so that it was not possible for these methods to properly exchange ion for chemically strengthening the glass surface. To dispose of this defect, trials were executed for coloring glass surface chemically strengthened. However, since the strength was lowered by the thermal treatment executed for the coloring process, the method were not practically adopted.

A still another trial wherein organic solvent containing organic colorant is coated with the chemically strengthened glass, for example, the sol-gel method was tried. Nevertheless, the trial failed to evenly form colored layer having uniform thickness on a variety of shapes of the covering glass. Namely, depending on the shape of the covering glass, the colored effect was uneven, and yet, organic colorant proved to be poor in the durability.

As mentioned above, it was quite difficult for any conventional art to properly form durable color layer under a low temperature by chemically strengthening the covering glass having various shapes without sacrificing own strength of the colored layer.

The object of the ninth embodiment of the invention is to provide a novel covering glass free from those technical problems mentioned above.

SUMMARY OF THE INVENTION

During the past many years, inventors followed up study on the introduction of an organic colorant into a silicon dioxide film. The inventors have discovered that in a process for forming an extremely dense silicon dioxide film on a substrate wherein the substrate is contacted with a processing solution, namely a hydrosilicofluoric acid solution supersaturated with silicon dioxide, addition of an organic colorant into the processing solution provides a silicon dioxide film containing organic colorant, thus the inventors have achieved the invention. The present invention comprises the first step to supersaturate a hydrosilicofluoric acid solution with silicon dioxide; the second step to add an organic colorant to the solution, and the third step to form a silicon dioxide film containing organic colorant on the substrate.

In the first step, the processing solution is prepared by making a hydrosilicofluoric acid solution containing silicon dioxide in a supersaturated state. The method of preparing this solution is not limited to one specific method, but a variety of conventional methods can be adopted. for example, like addition of $H_3BO_3$, aluminium, $Al(OH)_3$ to the above solution, or heating the above solution, or the like.

In the second step, an organic colorant is added to the prepared solution. Normally, the organic colorant is added to the solution after being dissolved or dispersed in water or a water-miscible solvent such as methanol or ethanol. Also, the organic colorant can directly be added to the solution. Table 1 designates concrete examples of the organic colorant that can be introduced into the silicon dioxide film. The second step can be included in the first step.

TABLE 1

| Name of organic colorant | Name of manufacturer |
| --- | --- |
| MALACHITE GREEN | HODOGAYA CHEMICAL |
| VICTORIA BLUE BH | CO., LTD. |
| VICTORIA PURE BLUE BOH | |
| METHYL VIOLET PURE SP | |
| CATHILON RED T-BLH | |
| CATHILON RED GTLH | |
| CATHILON BLUE T-BLH | |
| CATHILON YELLOW T-RLH | |
| CATHILON YELLOW 7GLH | |
| CATHILON BRILLIANT 10GFH | |
| CATHILON BLACK MH | |
| CATHILON BLACK CD-BLH | |
| CATHILON BLACK SH | |
| ALIZARINE ASTROL | TOKYO KASEI |
| RHODAMINE 6G | KABUSHIKI KAISHA |
| RHODAMINE B | |
| SULFORHODAMINE B | |
| ACRDINE RED | |
| FLUORESCEIN | |
| 2,5-diphenyloxazol | |
| 1,4-bis[2-(5-phenyl-oxazolyl)]benzene | |
| KAYACYL YELLOW GG | NIPPON KAYAKU |
| KAYACYL RHODAMINE FB | CO., LTD. |
| BLUE 5P | |
| RED 21P | |
| RED 3P | |

TABLE 1-continued

| Name of organic colorant | Name of manufacturer |
| --- | --- |
| GREEN 10P | |
| TG-21 | |
| NK-125 | NIPPON KANKO |
| NK-78 | SHIKISO KENKYUSHO |
| NK-123 | |
| NK-863 | |
| NK-1144 | |
| NK-1331 | |
| COUMARINE 504 | EXCITON CHEMICAL |
| COUMARINE 521 | CO., LTD. |
| COUMARINE 523 | |
| COUMARINE 525 | |
| COUMARINE 535 | |
| COUMARINE 540 | |
| FLUOROL 555 | |
| RHODAMINE 123 | Kodak |
| RHODAMINE 116 | |
| RHODAMINE 110 | |
| RHODAMINE 19 | |
| COUMARINE 6 | |
| PSD-HR | Nippon Soda Co., Ltd. |
| PSD-O— | |
| DIACELLITON FAST RED R | MITSUBISHI CHEMICAL INDUSTRIES LTD. |
| TPP | DOJIN KAGAKU KENKYUSHO |
| 2-(1-naphthyl)-5-phenyloxazol | Lancaster Synthesis Co., Ltd. |

From another point of view, the colorants shown in Table 1 are classified as follows:

(1) triphenylmethane colorants: MALACHITE GREEN and the like (2) oxazol colorants: 2,5-diphenyloxazol and the like (3) xanthene colorants: RHODAMINE 6G and the like (4) fluoran colorants: PSD-HR and the like (5) cyanine colorants: NK-125 and the like (6) coumarine colorants: COUMARINE 504 and the like (7) porphyrin colorants: TPP and the like And therefore, other colorants belonging to any of the above classes can be effectively used as organic colorant.

Further, colorants which have substituents or basic atom (i.e., nitrogen) in their skeleton can be generally adoptable.

In the third step, a substrate is brought into contact with the processing solution. Although contact is achieved by allowing the prepared solution to flow down on the surface of substrate, it is simple and is preferable that the substrate is immersed in the processing solution stored in a bath because an uniform film of silicon dioxide containing organic colorant can easily be formed on the surface of substrate even if it has extremely complex configuration.

It is enough that the temperature of the processing solution is held at the room temperature when immersing the substrate in the solution. Although the maximum temperature of the solution is not clearly defined, it is preferable that the temperature does not exceed about 35° C. It is useless to thoughtlessly raise the temperature of the solution because the added organic colorant may be decomposed.

In contrast with the film formed by applying a conventional sol-gel method, the silicon dioxide film containing organic colorant formed by execution of the serial steps mentioned above is extremely dense without allowing presence of film defects such as foam or bubbles.

The present invention performs the formation of silicon dioxide film containing organic colorant in a uniform processing solution. Since the reaction for the formation of the above film goes on at the room temperature, the organic colorant in the solution is uniformly introduced into the film without being decomposed at all.

Since the produced film is extremely dense and firmly adheres to the substrate, even if it has smooth surface, no thermal treatment is required. The film is formed on the substrate by precipitation of silicon dioxide from the supersaturated solution, and as a result, the silicon dioxide film containing organic colorant obtained by the invention is perfectly free from impurities like undecomposed raw material or solvent. The starting raw material used in the invention is extremely inexpensive and dispenses with thermal treatment at a high temperature, thus minimizing the film production cost. Furthermore, since the applicable materials are subject to reaction in the uniform solution, satisfactory silicon dioxide film containing organic colorant with uniform thickness can be formed on substrates including those which have extremely complex configuration.

FIRST EMBODIMENT

The method of dyeing molded organic substrate concerning the first embodiment of the present invention is composed of those sequential processes described below.

The primary film is formed on the molded organic substrate by coating and curing at least one kind of silicon compound selected from a group consisting of organic silicon compounds represented by a general formula (I):

$$R^1{}_n Si(R^2)_{4-n}.$$

the hydrolyzates thereof, and colloidal silica. Next, the molded organic substrate bonded with the primary film is contacted with the processing solution which is composed of hydrosilicofluoric acid solution, supersaturated with silicon dioxide, added an organic colorant such as an organic dyestuff or pigment before eventually forming the silicon dioxide film containing organic colorant on the surface of the molded organic substrate coated with the primary film. In the above general formula (I), $R^1$ designates an organic group containing hydrocarbon group having 1 through 6 of carbon number, vinyl group, methacryloxy group, epoxy group, amino group, melcapto group, fluorine or chlorine; $R^2$ designates either a single number or a plurality of bond groups selected from a group consisting of alkoxy group, alkoxyalkoxy group, acetoxy group and chlorine; n designates 0 through 4.

Those molded substrates made from organic material used for the first embodiment of the invention include a variety of molded resinous materials such as thermoplastic resins represented by polyvinyl chloride, polystylene, polycarbonate, polymethyl methacrylate, polyamide, polyacetal, polybutylene terephthalate, and polyphenylene oxide; and those thermosetting resins represented by polydiethyleneglycolbisallyl carbonate, and phenol resin; furthermore, the first embodiment of the invention is also applicable to cellulosic materials such as pulp, paper, fibers, protein fibers, and synthetic fibers represented by nylon, vinylon, polyacrylonitrile, polyethylene and triacetate. Although there is no limitation to the shape of the molded substrates for the first embodiment being applied, the shapes generally adopted are plate, film, rod, tube, sphere, pulverulent body, fiber, web, and a variety of processed forms.

As to the typical example of organic silicon compounds represented by the general formula (I): tetramethylsilane, trimethylmethoxysilane, dimethyldimethoxysilane, methyltrimethoxysilane, tetraethoxysilane, phenyltrimethoxysilane, phenylmethyldimethoxysilane, vinyltriethoxysilane, vinyltris($\beta$-methoxyethoxy)silane, vinyltriacetoxysilane, $\gamma$-methacryloxypropyltrimethoxysilane, $\gamma$-aminopropyltriethoxysilane, N-($\beta$-aminoethyl) -$\gamma$-aminopropyltrimethoxysilane, N-bis($\beta$-hydroxylethyl)-$\gamma$-aminopropyltriethoxysilane, N-($\alpha$-aminoethyl)-$\gamma$-aminopropyl(methyl)dimethoxysilane, $\gamma$-melcaptopropyltrimethoxysilane, 3,3,3 - trifluoropropyltrimethoxysilane, $\gamma$-glycidoxypropyltrimethoxysilane, $\beta$-(3,4 -epoxycyclohexyl)ethyltrimethoxysilane, methyltrichlorosilane, dimethyldichlorosilane, trimethylchlorosilane, and tetrachlorosilane are exemplified.

The primary film is formed on the molded organic substrate by applying at least one kind of material selected from a group consisting of the silicon compounds represented by the general formula (I), the hydrolyzate thereof and colloidal silica In this case, before forming the primary film, if the primer layer of organic resin is provided on the surface of the molded organic substrate, adhesive strength of the primary film against the substrate is significantly promoted. There is no limitation to the material for the primer layer provided that it has sufficient adhesive strength against the substrate. As the material for the primer layer, denatured polyolefin, acrylic, polyester, polyurethane, polyvinyl alcohol, vinyl acetate, vinyl chloride, phenol, epoxy, or copolymer of these can be adopted.

To promote the adhesive strength of the primer layer composed of any of those organic resin cited above, before forming the primary layer, the organic substrate surface may be provided with hydrophillic property by preliminarily treating the organic substrate surface with corona treatment, plasma treatment, saponification treatment, or by radiation of ultraviolet rays.

The primary layer can easily be formed by initially coating the substrate surface with selected resinous material cited above by any convenient means such as spraying, dipping or brushing before curing it by applying heat, ultraviolet rays, or electron beam.

It is preferable for the first embodiment of the present invention that the thickness of primer layer is in the range of about 0.05 to about 10 $\mu$m.

As is mentioned above, in the first embodiment of the present invention, preferably forming film of the primer layer, thereafter the primary film is formed by curing organic silicon compound.

Considering the adhesive strength between the formed primary layer and the silicon dioxide film containing colorant to be formed on the primary layer, it is preferable that organic silicon compound is used in the state of mixture which satisfies the following condition (a) or (b).

(a) At least a kind of silicon compound containing amino group represented by a general formula (II) and at least a kind of silicon compound represented by a general formula (III) so that the blend ratio between the total molar concentration (A) of the above silicon compound containing the amino group represented by the general formula (II) and the total molar concentration (B) of the silicon compound represented by the general formula (III) satisfies the relationship of $0 \leq B/A < 10$.

$$R^3{}_mSi(R^4)_{4-m} \quad (II)$$

$$R^5{}_lSi(R^6)_{4-l} \quad (III)$$

where $R^3$ designates an organic group containing amino group; $R^4$ designates an alkoxy group, $R^5$ designate an organic group containing hydrocarbon group having not more than 2 of the carbon mumber such as methyl group, or vinyl group, or hydroxyl group; and $R^6$ designates an alkoxyalkoxy group; m designates 1 or 2; and l designates 0 or 1, respectively.

(b) Silicon compound containing methacryloxy group represented by a general formula (IV) and the hydrolyzed silicon compound represented by a general formula (V) so that the ratio between the weight (C) converted into $R^7SiO_{3/2}$ from the silicon compound containing methacryloxy group represented by a general formula (IV) and the weight (D) converted into $SiO_2$ from the hydrolyzed silicon compound represented by the general formula (V) satisfies the relationship of $0.1 < D/C$.

$$R^7Si(R^8)_3 \quad (IV)$$

$$Si(R^9)_4 \quad (V)$$

where $R^7$ designates an organic group containing methacryloxy group; $R^8$ and $R^9$ respectively designate either a kind or a plurality of complex groups selected from the group consisting of alkoxy group, alkoxyalkoxy group, acetoxy group and chlorine.

The hydrolyzed silicon compound represented by the general formula (I) contains such compounds as part or the whole of the alkoxy group, or alkoxyalkoxy group, acyloxy group or chlorine, is/are substituted by hydroxyl group and such compound as part of the substituted hydroxyl groups bound together themselves naturally. These hydrolyzates can be generated by hydrolyzating those compounds mentioned above in presence of acid in the blended solvent composed of water and alcohol for example. As to methods for forming the primary film, any of those method may be used, which include the wet method wherein organic resinous material are applied to the substrate and thereafter they are cured by applying heat, ultraviolet rays, or electron beam and the dry methods including vacuum deposition, ion-plating, sputtering, or plasma polymerization. Nevertheless, in order to form the primary film on the organic substrate of large scale or arbitrary shapes, the wet method is preferable.

In this case, it is desirable that the thickness of the primary film is adjusted in a range from 10 nm to 100 nm. If less than 10 nm of the film thickness is provided, adhesive strength of the silicon dioxide film containing organic colorant to be formed later on becomes too weak. Conversely, if more than 100 nm of the film thickness is provided, the primary film itself becomes liable to lose transparency caused by milky color generated in the film.

As is mentioned above, in the first embodiment of the present invention, the organic molded substrate is colored by forming silicon dioxide film containing organic colorant on the surface of the organic molded substrate after the substrate is contacted with processing solution which is prepared by adding organic colorant such as dyestuff or pigment into hydrosilicofluoric acid solution supersaturated with silicon dioxide.

The hydrosilicofluoric acid solution supersaturated with silicon dioxide can be prepared by adding additive reacting fluorine ion such as boric acid, aqueous ammonia, metal composed of elements having the ionization tendency greater than that of hydrogen or metal halide, to the hydrosilicofluoric acid solution in which silicon dioxide dissolved and saturated. Likewise, as shown in Japanese Laid-Open Patent Publication No. 61-281047 of 1986, the above hydrosilicofluoric acid solution supersaturated with silicon dioxide can be prepared by raising temperature of the hydrosilicofluoric acid solution saturated with silicon dioxide.

The organic colorant can directly be added to the hydrosilicofluoric acid solution saturated or supersaturated with silicon dioxide. Also, the organic colorant can preliminarily be dissolved in water before being added to the hydrosilicofluoric acid solution. Furthermore, insoluble organic colorants can also be added to the hydrosilicofluoric acid solution by preliminarily being dissolved in water-soluble organic solvent.

It is preferable that concentration of hydrosilicofluoric acid is in the range from 1.5 mol/L to 3.5 mol/L.

Examples of these organic colorants are as follows: Dyestuffs such as KAYACYL YELLOW GG (a product of NIPPN KAYAKU CO., LTD.), MALACHITE GREEN (a product of HODOGAYA CHEMICAL CO., LTD.), ARIZARINE ASTROL (a product of TOKYO KASEI K.K.), METHYL VIOLET PURE SP (a product of HODOGAYA CHEMICAL CO., LTD.), RED 21P (a product of NIPPON KAYAKU CO., LTD.), KAYACYL RHODAMINE FB (a product of NIPPON KAYAKU CO., LTD.), VICTORIA PURE BLUE BOH (a product of HODOGAYA CHEMICAL CO., LTD.), BLUE 5P (a product of NIPPON KAYAKU CO., LTD.), RED 3P (a product of NIPPON KAYAKU CO., LTD.), VICTORIA BLUE BH (a product of HODOGAYA CHEMICAL CO., LTD.), and GREEN 10P (a product of NIPPON KAYAKU CO., LTD.). Disperse pigment such as DIACELLITON FAST RED (a product of MITSUBISHI CHEMICAL INDUSTRIES, LTD.). Laser colorant such as ACRDINE RED, FLUORESCEIN, RHODAMINE B, RHODAMINE 6G, RHODAMINE 19, RHODAMINE 110, RHODAMINE 116, RHODAMINE 123, SULFORHODAMINE B and COUMARINE 6.

In this specification, the term "laser colorant" means a colorant developing a color by means of laser radiation.

Silicon dioxide film containing organic colorant can properly be formed on the surface of the organic substrate by contacting the organic substrate coated with the primary film with the processing solution prepared in the above-mentioned manner. This functionally materializes dyeing and coloration.

As to the method in which the substrate is contacted with processing solution, it is simple and preferable that the substrate is immersed in a bath in which the processing solution is filled although the substrate may be contacted with the processing solution by flowing the solution on the surface of the substrate because satisfactory silicon dioxide film having uniformly dispersed organic colorant can be formed on the entire surface of the substrate even if it had extremely complex configuration.

The temperature of the processing solution is enough around the room temperature at the time of contact with the substrate. Although there is no clear upper limit for the temperature of processing solution, the upper limit is preferably about 35° C. It is useless to thoughtlessly raise temperature of the processing solution because the added organic colorant may be decomposed.

Since organic colorant is uniformly dispersed in the processing solution, it is possible for the first embodiment of the invention to easily form silicon dioxide film containing uniformly dispersed organic colorant. Since the reaction for the formation of silicon dioxide film goes on in the vicinity of the room temperature, the organic colorant in the solution is uniformly introduced into the film without being decomposed. In addition, since the silicon dioxide film is extremely dense and firmly adheres to the substrate, no thermal treatment is required. Since the film formation is implemented by precipitation from the supersaturated solution, the silicon dioxide film containing organic colorant is almost free from impurities like undecomposed raw material or solvent. In addition, since the starting raw material used for the first embodiment of the present invention is extremely inexpensive, and yet, it requires no thermal treatment at a high temperature, the film production cost can be minimized. Furthermore, since the reaction for the formation of the silicon dioxide film is carried on in the solution containing uniformly dispersed organic colorant, the first embodiment of the present invention can securely provide satisfactory silicon dioxide film containing organic colorant having uniform thickness all over the substrate surface even though it had extremely complex configuration.

SECOND EMBODIMENT

The second embodiment of the present invention is a method for coloring a molded acrylic resin substrate by applying the method for manufacturing the molded acrylic resin substrate coated with silicon dioxide film proposed by Japanese Laid-Open Patent Publication No. 1-101339 of 1989. Concretely, the second embodiment of the present invention relates to a method for manufacturing the molded acrylic resin substrate coated with silicon dioxide, wherein the primary film is initially generated by coating and curing organic silicon compound on the molded acrylic substrate and then the molded acrylic substrate coated with the primary film formed by contacting the substrate with the processing solution formed by adding organic colorant such as dyestuff or pigment to the hydrosilicofluoric acid solution supersaturated with silicon dioxide so that the silicon dioxide film containing organic colorant can eventually be formed on the primary film.

The essential point of the second embodiment of the present invention is that: a method of manufacturing acrylic resin molded substrate coated with silicon dioxide containing organic colorant, wherein mixture which includes silicon compound having a methacryloxy group represented by a general formula (VI) and the hydrolyzate of silicon compound represented by a general formula (VII) so that the ratio between the weight (A) converted into $R^{11}SiO_{3/2}$ from the silicon compound containing the methacryloxy group represented by the general formula (VI) and the weight (B) converted into $SiO_2$ from the silicon compound represented by the general formula (VII) satisfies the relationship of $0.1 < B/A < 0.5$ is coated and cured.

$$R^{11}Si(R^{12})_3 \tag{VI}$$

$$Si(R^{13})_4 \tag{VII}$$

where $R^{11}$ designates an organic group containing methacryloxy group, $R^{12}$ and $R^{13}$ respectively designate either a kind or a plurality of bound groups selected from a group consisting of alkoxy group, alkoxyalkoxy group, acetoxy group and chlorine.

When the surface of the molded plastic substrate is directly coated with silicon dioxide containing the organic colorant by precipitation process, a film having poor adhesive ability and uneven thickness is only obtained caused by poor reactivity and wetting property between the hydrosilicofluoric acid solution and the plastic substrate. On the other hand, if the molded plastic substrate is preliminarily coated with organic silicon compound, which is properly cured, the silanol group on the surface provides bonding property with the silicon component in the hydrosilicofluoric acid solution, so that adhesive strength and unevenness of the silicon dioxide film containing organic colorant obtained by the precipitation process can be improved.

Nevertheless, when the primary film having thickness of not more than 2 or 3 hundreds Å is formed by means of coating and curing organic silicon compound, in order to produce silicon dioxide film containing organic colorant having uniform thickness and sufficient adhesive strength by precipitation process, it is necessary to select organic silicon compound in accordance with kinds of plastic.

Inventors earnestly studied on the organic silicon compound available for the formation of the primary film suited for the molded acrylic substrate, and finally discovered that the mixture of silicon compound containing methacryloxy group represented by the general formula (VI) and the hydrolyzate of silicon compound represented by the general formula (VII) was optimal under a specific ratio.

The second embodiment of the present invention is described below. To materialize the second embodiment, among silicon compounds containing methacryloxy group represented by the general formula (VI) usable for the formation of the primary film, it is preferable that γ-methacryloxypropyltrimethoxysilane is used. As silicon compounds represented by the general formula (VII), tetraethoxysilane is exemplified, and as the hydrolyzates include the followings: part or the whole of alkoxy groups, or alkoxyalkoxy groups, acyloxy group, or chlorine of silicon compound is/are substituted by hydroxyl groups, and part of the substituted hydroxyl groups being condensated themselve naturally. The hydrolyzate can easily be generated by hydrolyzing those silicon compounds cited above in the blended solvent such as water and alcohol mixture in presence of acid.

Either one kind or a plural kinds of silicon compounds containing methacryloxy group represented by the general formula (VI) may be used. Likewise, either a kind or a plural kinds of silicon compounds represented by the general formula (VII) may also be used.

In the second embodiment mixing ratio of silicon compound containing methacryloxy group represented by the general formula (VI) and the hydrolyzate of silicon compound represented by the general formula (VII) is set so that the ratio between the weight (A) converted into $R^{11}SiO_{3/2}$ from the silicon compound containing methacryloxy group represented by the general formula (VI) and the weight (B) converted into $SiO_2$ from the silicon compound represented by the general formula (VII) satisfies the relationship of $0.1 < B/A < 0.5$.

The adhesive strength of silicon dioxide film containing organic colorant produced by the precipitation process is greatly affected by the mean molecular weight of acrylic resin of the molded acrylic resin substrate to be coated with film and also by the blend ratio B/A of the above silicon compounds.

In the second embodiment of the present invention, in order to form silicon dioxide film containing organic colorant featuring strong adhesive strength, it is preferable that the mean molecular weight of the applicable acrylic substrate is not more than 80,000 and yet, it is necessary that the mixing ratio A/B of the above silicon compound satisfies the relationship of $0.1 < B/A$.

Among methods which form the primary film by coating and curing the blend of silicon compound on the molded acrylic resin substrate, immersion method is most preferable, which uses such coating solution prepared by dissolving the blend of the above silicon compounds in a variety of available solvents.

It is desirable that the primary film is formed by selecting such coating conditions such as concentration of the silicon compound in the coating solution and the pull up speed so as to form film on a glass substrate (for example, a conventional plate glass or soda-lime glass) from 5 to 50 nm of the film thickness, preferably from 10 to 30 nm of the film thickness if the conditions are applied thereto.

More particularly, if the primary film is formed under the condition allowing the formation of film having around 50 nm of thickness, even though the substrate had uneven surface having sub-micron concaves and convexes, uniform film following to the configuration of the substrate can be formed on the substrate. Conversely, if the primary film is formed under the condition to cause the thickness to become thicker than 50 nm on the glass substrate, there is a fear that uniform film following to the configuration of the substrate is not formed on the substrate. Furthermore, it is not preferable to adopt such conditions as to form a film of thickness not more than 5 nm on the glass substrate, since adhesive strength of the silicon dioxide film containing organic colorant produced by the precipitation process is lowered.

In the second embodiment of the present invention, in order to form the primary film with such thickness, it is preferable that concentration of silicon compound contained in the coating solution is from 0.5 to 3.0 % by weight.

Since the silicon compound containing the methacryloxy group represented by the general formula (VI) contained in the primary film coated on the acrylic substrate permeates the acrylic substrate, uniform film is formed on the substrate even having sub-micron concaves and convexes on its surface if the thickness of the primary film is within a certain limit. On the other hand, since the hydrolyzate of the silicon compound represented by the general formula (VII) cannot permeate the acrylic substrate, if the blend ratio (B/A) mentioned above is increased, uniform film following to the configuration of the substrate cannot be formed. As a result, in the second embodiment of the present invention, the blend ratio B/A is set not more than 0.5.

In the second embodiment of the present invention, acrylic resin molded substrate is colored by coating silicon dioxide film containing organic colorant on the acrylic resin substrate with the primary film is such a manner as to contact the substrate with processing solution prepared by adding organic colorant such as dyestuff or pigment into hydrosilicofluoric acid solution supersaturated with silicon dioxide.

The hydrosilicofluoric acid solution supersaturated with silicon dioxide can be prepared by adding additive reacting fluorine ion such as boric acid, aqueous ammonia, metal composed of elements having the ionization tendency greater than that of hydrogen or metal halide, to the hydrosilicofluoric acid solution in which silicon dioxide dissolved and saturated. Likewise, as is described in Japanese Laid-Open Patent Publication No. 61-281047 of 1986, the above solution can also be prepared by raising temperature of hydrosilicofluoric acid solution saturated with silicon dioxide.

The organic colorant can directly be added to hydrosilicofluoric acid solution containing saturated or supersaturated silicon dioxide. Alternatively, after preliminarily being dissolved in water, organic colorant can also be added to the hydrosilicofluoric acid solution. Likewise, after preliminarily being dissolved in water-miscible organic solvent, water-insoluble organic colorant can also be added to the hydrosilicofluoric acid solution. It is preferable that concentration of hydrosilicofluoric acid solution is from 1.5 to 3.5 mol/L. Examples of these organic colorant are as follows: Dyestuffs such as KAYACYL YELLOW GG (a product of NIPPON KAYAKU CO., LTD.), MALACHITE GREEN (a product of HODOGAYA CHEMICAL CO., LTD.), ALIZARINE ASTROL (a product of TOKYO KASEI K.K.), METHYL VIOLET PURE SP (a product of HODOGAYA CHEMICAL CO., LTD.), RED 21P (a product of NIPPON KAYAKU CO., LTD.), KAYACYL RHODAMINE FB (a product of NIPPON KAYAKU CO., LTD.), VICTORIA PURE BLUE BOH (a product of HODOGAYA CHEMICAL CO., LTD.), BLUE 5P (a product of NIPPON KAYAKU CO., LTD.), RED 3P (a product of NIPPON KAYAKU CO., LTD.), VICTORIA BLUE BH (a product of HODOGAYA CHEMICAL CO., LTD.) and GREEN 10P (a product of TOKYO KASEI K.K.). Disperse Pigment such as DIACELLITON FAST RED (a product of MITSUBISHI CHEMICAL INDUSTRIES LTD.). Laser colorants such as ACRDINE RED, FLUORESCEIN, RHODAMINE B, RHODAMINE 6G, RHODAMINE 19, RHODAMINE 110, RHODAMINE 116, RHODAMINE 123, SULFORHODAMINE B, COUMARINE 6.

Silicon dioxide film containing organic colorant is formed on the surface of molded organic substrate coated with the primary film by contacting the processing solution prepared in the above-mentioned manner thus functionally materializing dyeing and coloration.

As to the method in which the substrate is contacted with processing solution, it is simple and preferable that the substrate is immersed in a bath in which the processing solution is filled although the substrate may be contacted with the processing solution by flowing the solution on the surface of the substrate because the immersion method securely forms uniform silicon dioxide film containing organic colorant even if the substrate had extremely complex configuration. The temperature of the processing solution is enough around the room temperature at the time of contact with the substrate. Although there is no clear upper limit for the temperature of processing solution, the upper limit is preferably about 35° C. It is useless to raise temperature of the processing solution without care because the added organic colorant may be decomposed.

Since organic colorant is uniformly dispersed in the processing solution, it is possible for the second embodiment of the invention to easily form silicon dioxide film uniformly dispersed organic colorant. Since the reaction for the formation of film goes on in the vicinity of the room temperature, the organic colorant in the processing solution is uniformly introduced into the film without being decomposed. Furthermore, since the formed film is extremely dense and firmly adheres to the substrate, no thermal treatment is required. Since the formation of the film is carried out by the precipitation from the supersaturated silicon dioxide solution, the silicon dioxide film containing organic colorant produced by the second embodiment of the invention is almost free from impurities like undercomposed raw material or solvent. The starting raw material used for implementing the second embodiment is extremely inexpensive, and yet, the thermal treatment at a high temperature is not required. As a result, the film production cost can be minimized. Furthermore, since reaction is carried out in the uniformly prepared solution, silicon dioxide film containing organic colorant having uniform thickness and color distribution can be formed on the molded substrate even though it has extremely complex configuration.

THIRD EMBODIMENT

The third embodiment of the present invention implements coloration of molded polycarbonate substrate by applying a method for manufacturing the molded polycarbonate substrate coated with silicon dioxide proposed by Japanese Laid-Open Patent Publication No. 62-291536 of 1987. More particularly, the third embodiment of the present invention relates to a method for manufacturing a molded polycarbonate substrate coated with silicon dioxide, wherein the primary film is formed by coating and curing organic silicon compound on the molded polycarbonate substrate and then the molded polycarbonate substrate coated with primary film is contacted with the processing solution prepared by adding organic colorant such as dyestuff or pigment to the hydrosilicofluoric acid solution supersaturated with silicon dioxide so that silicon dioxide film containing organic colorant can eventually is formed on the primary film.

The essential point of the third embodiment of the present invention is that:
a method for manufacturing polycarbonate coated with silicon dioxide containing organic colorant, wherein the primary film is formed by coating and drying coating solution including silicon compound having amino group and at least one kind of compound selected from a group consisting of silicon compound represented by a general formula (VIII) and hydrolyzates thereof so that inclusion of silicon compound having amino group is not less than 0.2% by weight and concentration of total silicon compound is not more than 5% by weight.

$$R^{21}{}_nSi(R^{22})_{4-n} \quad \text{(VIII)}$$

where $R^{21}$ designates either hydrocarbon group containing not more than 2 of carbon number like ethyl group, vinyl group, or organic group having not more than 3 of carbon number containing melcapto group, hydroxyl group; $R^{22}$ designates one kind or plural kinds of bound group selected from a group consisting of alkoxy group, alkoxyalkoxy group, acetoxy group and chlorine; and n designates 0 or 1.

When the surface of the molded plastic substrate is directly coated with silicon dioxide containing the organic colorant by precipitation process, a film having poor adhesive ability and uneven thickness is only obtained caused by poor reactivity and wetting property between the hydrosilicofluoric acid solution and the plastic substrate. On the other hand, if organic silicon compound is preliminarily coated over the surface of the molded plastic substrate, which is cured, since silanol group on the surface provides bonding property with the silicon component in the hydrosilicofluoric acid solution, so that adhesive strength and unevenness of silicon dioxide film containing organic colorant obtained by the precipitation process can be improved.

However, when producing the primary film having thickness not more than 2 or 3 hundreds Å is formed by means of coating and curing organic silicon compound, in order to produce silicon dioxide film containing organic colorant having uniform thickness and sufficient adhesive strength, it is necessary to select organic silicon compound in accordance with kinds of plastic.

Inventors earnestly studied on organic silicon compound available for the formation of the primary film suited for the molded polycarbonate substrate, and then finally discovered that the blend of silicon compound containing amino group and at least one kind of compound selected from a group consisting of silicon compound represented by the general formula (VIII) and the hydrolyzate thereof was optimal for use under specific ratio.

The third embodiment of the present invention is described below. In the third embodiment, among silicon compounds available for the formation of the primary film, as silicon compounds containing amino group, γ-aminopropyltriethoxysilane, N-(β-aminoethyl)-γ-aminopropyltrimethoxysilane, N-(β-aminoethyl)-γ-aminopropylmethylmethoxysilance, etc are exemplified. These silicon compounds are effective for producing silicon dioxide film containing organic colorant and having strong adhesive strength by the precipitation process.

As silicon compound represented by the general formula (VIII), methyltriethoxysilane, tetraethoxysilane, vinyltrietoxysilane, vinyltris(β-methoxy)silane, vinyltriacetoxysilane, γ-melcaptopropyltrimethoxysilane, γ-hydroxypropyltrimethoxysilane, etc are exemplified. As hydrolyzates of the silicon compound represented by the general formula (VIII) includes the followings: a part or the whole of alkoxy group, alkoxyalkoxy group, acyloxy group and chrolide in the silicon compound represented by the general formula (VIII) is/are substituted by hydroxyl groups, and part of the substituted hydroxyl groups being condensated themselves naturally. Any of these hydrolyzates can easily be obtained by hydrolyzing those silicon compound cited above in the blended solvent such as water and alcohol mixture in presence of acid.

These silicon compounds cited above available to facilitate the formation of silicon dioxide film containing organic colorant by the precipitation method and to obtain silicon dioxide film containing organic colorant without unevenness.

If the primary film is formed with merely silicon compounds containing amino group, although depending on cases, either uneven formation of the colored film or milky color may occur in the silicon dioxide film containing organic colorant produced by the precipitation method. The above-mentioned defects can be prevented by blending silicon compound containing amino group with the silicon compound represented by the general formula (VIII) (or the hydrolyzate thereof).

Although the primary film is formed uniformly with merely the silicon compound represented by the general formula (VIII) by the precipitation method, the obtained silicon dioxide film containing organic colorant is poor in adhesive strength. As a result, it is necessary for the primary film formation to use the silicon compound represented by the general formula (VIII) with the silicon compound containing amino group.

Either one kind or plural kinds of the silicon compound represented by the general formula (VIII) (or the hydrolyzate thereof) may be used. Likewise, either one kind or plural kinds of the silicon compound containing amino group may also be used.

In the third embodiment, the primary film is formed by coating and curing coating solution containing the silicon compound having amino group and at least one kind of compound selected from a group consisting of the silicon compounds represented by the general formula (VIII) and the hydrolyzates thereof on the molded polycarbonate substrate, followed by the drying process. The coating solution is prepared by dissolving a silicon compound containing amino group and the silicon compounds represented by the general formula (VIII) and the hydrolyzates thereof so that the silicon compound containing amino group is not less than 0.2% by weight and concentration of total silicon compound in the solution is not more than 5% by weight.

Solvent used in the third embodiment must be selected in consideration of the solubility of the polycarbonate substrate and the wetting property of the solvent against the substrate. In other words, such solvent dissolving polycarbonate as toluene or xylene must not be used. Likewise, water having poor wetting property against the polycarbonate substrate should not be used alone. However, water of which wetting property is improved by adding surface active agent against the polycarbonate substrate can be used. Immersion method is most preferable as coating method. Either method using heat ultraviolet rays or electron beam may be used as method for drying and curing the coated film.

It is desirable that the primary film is formed by selecting such coating conditions such as concentration of the silicon compound in the coating solution and the pull-up speed as to form film on a glass substrate (for example, a conventional plate glass or soda-lime glass) from 5 to 100 nm of the film thickness, preferable from 10 to 50 nm of the film thickness if the conditions are applied thereto.

Since the silicon compound permeates the polycarbonate substrate, thickness of the primary film formed on the polycarbonate substrate becomes thinner than that of the primary film formed on the glass substrate. Accordingly, if the primary film is formed based on the condition which allows formation of the primary film having not more than 100 nm of thickness on the glass substrate, even if the polycarbonate substrate had submicron concaves and convexes on the surface, uniform film following the concaves and convexes can be obtained. If the primary film were formed based on the condition which causes the film thickness on the glass substrate to exceed 100 nm, there is a fear that uniform film following to the concaves and convexes on the surface of the polycarbonate substrate is not formed. Conversely, it is not preferable to adopt such conditions as to form a film of thickness under 5 nm on the glass substrate, since adhesive strength of the silicon dioxide film containing organic colorant produced by precipitation method is lowered.

In the third embodiment of the present invention, in order to form the primary film with such thickness, it is preferable that the concentration of the silicon compound contained in the coating solution is from 0.2 to 5% by weight, and more preferably from 0.5 to 2% by weight. However, in order to prevent degradation of the adhesive strength of the silicon dioxide film containing organic colorant produced by the precipitation method, it is preferable that concentration of silicon compound containing amino group is not less than 0.2% by weight, and more preferably not less than 0.5% by weight in the coating solution.

Since the silicon compound containing amino group, and the other silicon compound represented by the general formula (VIII) or the hydrolyzate thereof in the primary film coated on the polycarbonate substrate respectively permeate the polycarbonate substrate, uniform film following the concaves and convexes of submicron on the surface of the substrate is formed if the thickness of the primary film is within a certain limit. Furthermore, due to the presence of the silicon compound containing amino group, silicon dioxide film containing organic colorant having strong adhesive strength can be obtained.

In the third embodiment of the present invention, PC molded substrate is colored by coating silicon dioxide film containing organic colorant on the PC molded substrate with the primary film in such a manner as to contact the substrate with processing solution prepared by adding organic colorant such as dyestuff or pigment into hydrosilicofluoric acid solution supersaturated with silicon dioxide.

The hydrosilicofluoric acid solution supersaturated with silicon dioxide can be prepared by adding additive reacting fluorine ion such as boric acid, aqueous ammonia, metal composed of elements having the ionization tendency greater than that of hydrogen or metal halide to the hydrosilicofluoric acid solution in which silicon dioxide is dissolved and saturated. Likewise, as is described in Japanese Laid-Open Patent Publication No. 61-281047 of 1986, the above solution can also be prepared by raising temperature of hydrosilicofluoric acid solution saturated with silicon dioxide.

The organic colorant can directly added to the hydrosilicofluoric acid solution containing saturated or supersaturated silicon dioxide. Alternatively, organic colorants can be added to the hydrosilicofluoric acid solution after preliminarily being dissolved in water. Furthermore, after preliminarily being dissolved in water-miscible organic solvent, water-insoluble organic colorants can also be added to the hydrosilicofluoric acid solution.

It is preferable that concentration of hydrosilicofluoric acid solution is from 1.5 to 3.5 mol/L. Examples of the organic colorant are as follows: Dyestuffs such as KAYACYL YELLOW GG (a product of NIPPON KAYAKU CO., LTD.), MALACHITE GREEN (a product of HODOGAYA CHEMICAL CO., LTD.), ALIZARINE ASTROL (a product of TOKYO KASEI K.K.), METHYLVIOLET PURE SP (a product of HODOGAYA CHEMICAL CO., LTD.), RED 21P (a product of NIPPON KAYAKU CO., LTD.), KAYACYL RHODAMINE FB (a product of NIPPON KAYAKU CO., LTD.), VICTORIA PURE BLUE BOH (a product of HODOGAYA CHEMICAL CO., LTD.), BLUE 5P (a product of NIPPON KAYAKU CO., LTD.), RED 3P (a product of NIPPON KAYAKU CO., LTD.), VICTORIABLUE BH (a product of HODOGAYA CHEMICAL CO., LTD.) and GREEN 10P (a product of NIPPON KAYAKU CO., LTD.). Disperse pigment such as DIACELLITON FAST RED (a product of MITSUBISHI CHEMICAL INDUSTRIES LTD.) Laser colorant such as ACRYDINE RED, FLUORESCEIN, RHODAMINE B, RHODAMINE 6G, RHODAMINE 19, RHODAMINE 110, RHODAMINE 116, RHODAMINE 123, SULFORHODAMINE B, COUMARINE 6.

Silicon dioxide film containing organic colorant is formed on the surface of the molded polycarbonate substrate coated with the primary film by contacting the processing solution prepared in the above-mentioned manner thus functionally materializing dyeing and coloration.

As to the method in which the substrate is contacted with processing solution, it is simple and preferable that the substrate is immersed in a bath in which the processing solution is filled for although the substrate may be contacted with the processing solution by flowing the solution on the surface of the substrate because the immersion method securely forms uniform silicon dioxide film containing organic colorant even though the substrate had extremely complex configuration. The temperature of the processing solution is enough around the room temperature at the time of contact with the substrate. Although there is no clear upper limit for the temperature of processing solution, the upper limit is preferably about 35° C. It is useless to thoughtlessly raise the temperature of the processing solution because the added organic colorant may be decomposed.

Since the organic colorant is uniformly dispersed in the processing solution, it is possible for the third embodiment of the invention to easily form silicon dioxide film uniformly dispersed organic colorant.

Since the reaction for the formation of film goes on in the vicinity of the room temperature, organic colorant in the processing solution is uniformly introduced into the film without being decomposed. Furthermore, since the formed film is extremely dense and firmly adheres to the substrate, no thermal treatment is required. Since the formation of the film is carried out by precipitation from the supersaturated silicon dioxide solution, the silicon dioxide film containing organic colorant produced by the third embodiment of the invention is almost free from impurities like undecomposed raw material or solvent. The starting raw material used for implementing the third embodiment is extremely inexpensive, and yet, the thermal treatment at high a temperature is not required, the film production cost can be minimized. Furthermore, since reaction is carried out in the uniformly prepared solution, silicon dioxide film containing organic colorant having uniform thickness and color distribution can be formed on the molded substrate even though it has extremely complex configuration.

FOURTH EMBODIMENT

The fourth embodiment of the invention is materialized by coating the surface of pulverulent body with silicon dioxide film containing organic colorant such as organic dyestuff or pigment. To implement this, there is a conventional method called the sol-gel method in which pulverulent body is contacted with the solution containing hydrolyzed metal alkoxide added with organic colorant.

For example, this prior art is reported in a technical paper "J. Non-Cryst. Solida, 74 (1985), 395" describing the application of fluorescent organic colorant to a silicon dioxide film. Another technical paper "Ceramics, 21, No. 2, 1986, 111" proposes a doping of organic molecules into non-crystal quartz by the sol-gel method.

Nevertheless, it is necessary for the sol-gel method to thermally treat the formed film in the final production stage to fix the film to the substrate, and yet, since the produced film cannot thermally be treated at a high temperature which causes the internal organic colorant to easily be decomposed, the produced film unavoidably becomes porous. And also, in the sol-gel method, such organic colorant which is easily decomposed on receipt of thermal treatment under a low temperature cannot be introduced to the film. Furthermore, in the sol-gel method the heat treatment is obliged to be carried out under a low temperature, so that the problem inherent to the sol-gel method is aggravated. Namely, impurities such as undecomposed raw material or solvent remain in the film. Another problem of the sol-gel method is that since it uses expensive metal alkoxide as the starting raw material, the film production cost becomes high. Also, since in the sol-gel method the dip-coating method is adopted, the method cannot be applied to a substrate having complex configuration.

The fourth embodiment of the present invention utilizes a method for forming silicon dioxide film containing organic colorant such as dyestuff or pigment on pulverulent body in which the pulverulent body is contacted with processing solution prepared by adding organic colorant such as dyestuff or pigment to hydrosilicofluoric acid solution supersaturated with silicon dioxide. The hydrosilicofluoric acid solution containing supersaturated silicon dioxide can be prepared by adding boric acid, aqueous ammonia, metal halide or metal of which ionization tendency is greater than that of hydrogen to the hydrosilicofluoric acid solution saturated with silicon dioxide. Alternatively, the hydrosilicofluoric acid solution supersaturated with silicon dioxide can be prepared by raising temperature of the solution after adding silicon dioxide to the hydrosilicofluoric acid solution held at a low temperature (this is called "temperature-differentiation method"). Water-soluble organic colorant can directly be added to the above solution. Water-insoluble organic colorant can also be added to the solution after being dissolved in water-miscible organic solvent like alcohol. The organic colorant can be added to the hydrosilicofluoric acid solution saturated with silicon dioxide or it may also be added to the solution after the solution is supersaturated with silicon dioxide. In the fourth embodiment, the concentration of hydrosilicofluoric acid is not less than 1.0 mol/L, desirably from 1.5 to 3.0 mol/L is used. The temperature of the processing solution at the time of contact with the pulverulent body is from 15° to 60° C., desirably from 25° to 40° C. When the temperature-differentiation method is applied normally, silicon dioxide is saturated at not more than 10° C. And then, the pulverulent body is contacted with the processing solution of the temperature not less than 20° C., desirably from 40° C. to 60° C. Generally, the pulverulent body is contacted with the processing solution while being dispersed and stirred in the solution.

Example of organic colorants are dyestuffs and pigments such as RHODAMINE 6G, FLUORESCEIN, MALACHITE GREEN (a product of HODOGAYA CHEMICAL CO., LTD.), COUMARIN 6, SULFORHODAMINE B, RHODAMINE 19, RHODAMINE 110, RHODAMINE 116, RHODAMINE 123, KAYACYL YELLOW GG (a product of NIPPON KAYAKU CO., LTD.), RED 21P (a product of NIPPON KAYAKU CO., LTD.), ACRDINE RED, KAYACYL RHODAMINE FB (a product of NIPPON KAYAKU CO., LTD.), RED 3P (a product of NIPPON KAYAKU CO., LTD.), VICTORIA BLUE BH (a product of HODOGAYA CHEMICAL CO., LTD.), ALIZARINE ASTROL (a product of TOKYO KASEI K.K.), METHYL VIOLET PURE SP (a product of HODOGAYA CHEMICAL CO., LTD.), GREEN 10P (a product of NIPPON KAYAKU CO., LTD.), etc.

The pulverulent body may be composed of inorganic crystals such as titanium oxide, ferric oxide, barium sulfate, or mica. The pulverulent body may also be composed of amorphous inorganic material such as glass beads, glass balloon, or flakes. Furthermore, the pulverulent body may be composed of organic material such as polycarbonate resin or acrylic resin. In this case, in order to produce colored film having sufficient adhesive strength, it is desirable that the surface of the organic pulverulent body is initially coated with at least one kind of silicon compound selected from a group consisting of organic silicon compound composed of silane-coupling agent, hydrolyzate thereof and colloidal silica, and then the pulverulent body is immersed and dispersed in the processing solution before eventually producing the silicon dioxide film containing organic colorant.

FIFTH EMBODIMENT

The fifth embodiment of the invention is materialized by coating the surface of transparent substrate with silicon dioxide film containing organic colorant such as organic dyestuff or pigment.

To implement this, there is a conventional art called "sol-gel" method in which the transparent substrate is contacted with the solution containing hydrolyzed of metal alkoxide having organic colorant.

For example, this prior art is reported in a technical paper "J. Non-Cryst. Solids, 74 (1985), 395" describing the application of fluorescent organic colorant to the silicon dioxide film. Another technical paper "Ceramics, 21, No. 2, 1986, 111" proposes the doping of organic molecules into non-crystal quartz by the sol-gel method.

Nevertheless, it is necessary for the sol-gel method to thermally treat the formed film in the final production stage to fix the film to the substrate, and yet, since the produced film cannot thermally be treated at a high temperature which causes the internal organic colorant to easily be decomposed, the produced film unavoidably becomes porous. And also, in the sol-gel method, such organic colorant which is easily decomposed on receipt of thermal treatment under low temperature cannot be introduced to the film. Furthermore, in the sol-gel method the heat treatment is obliged to be carried out under a low temperature, so that the problem inherent to the sol-gel method is aggravated. Namely, impurities such as undecomposed raw material or solvent remain in the film. Another problem of the sol-gel method is that since it uses expensive metal alkoxide as the starting raw material, the film production cost becomes high. Also, since in the sol-gel method the dip-coating method is adopted, the method cannot be applied to a substrate having complex configuration.

The fifth embodiment of the present invention utilizes a method for forming silicon dioxide film containing organic colorant such as dyestuff or pigment on the transparent substrate in which the substrate is contacted with processing solution prepared by adding organic colorant such as dyestuff or pigment to hydrosilicofluoric acid solution supersaturated with silicon dioxide. The hydrosilicofluoric acid solution containing supersaturated silicon dioxide can be prepared by adding boric acid, aqueous ammonia, metal halide or metal of which ionization tendency is greater than that of hydrogen to the hydrosilicofluoric acid solution saturated with silicon dioxide. Alternatively, the hydrosilicofluoric acid solution supersaturated with silicon dioxide can be prepared by raising temperature of the solution after adding silicon dioxide to the hydrosilicofluoric acid solution held at a low temperature (this is called "temperature-differentiation method"). Water-soluble organic colorants can directly be added to the above solution. Water-insoluble organic colorants can also be added to the solution after being dissolved in water-miscible organic solvent like alcohol. The organic colorant can be added to the hydrosilicofluoric acid solution saturated with silicon dioxide or it may also be added to the solution after the solution is supersaturated with silicon dioxide. In the fifth embodiment, the concentration of hydrosilicofluoric acid is not less than 1.0 mol/L, desirably from 1.5 to 3.0 mol/L is used. The temperature of the processing solution at the time of contact with the transparent substrate is from 15° to 60° C., desirably from 25° to 40° C. When the temperature-differentiation method is applied, normally, silicon dioxide is saturated at not more than 10° C. And then, the transparent substrate is brought into contact with the prepared solution of the temperature at not less than 20° C., desirably from 40° to 60° C. Generally, the transparent substrate is contacted with the processing solution while being dispersed and stirred in the solution.

Examples of organic colorants are dyestuffs and pigments such as DIACELLITON FAST RED R (a product of MITSUBISHI CHEMICAL INDUSTRIES LTD.), BLUE 5P (a product of NIPPON KAYAKU Co., LTD.), RHODAMINE 6G, FLUORESCEIN, MALACHITE GREEN (a product of HODOGAYA CHEMICAL CO., LTD.), COUMARIN 6, SULFORHODAMINE B, RHODAMINE 19, RHODAMINE 110, RHODAMINE 116, RHODAMINE 123, KAYACYL YELLOW GG (a product of NIPPON KAYAKU CO., LTD.), RED 21P (a product of NIPPON KAYAKU CO., LTD.), ACRYDINE RED, KAYACYL RHODAMINE FB (a product of NIPPON KAYAKU CO., LTD.), RED 3P (a product of NIPPON KAYAKU CO., LTD.), VICTORIA BLUE BH (a product of HODOGAYA CHEMICAL CO., LTD.), ALIZARINE ASTROL (a product of TOKYO KASEI K.K.), METHYL VIOLET PURE SP (a product of HODOGAYA CHEMICAL CO., LTD.), GREEN 10P (a product of NIPPON KAYAKU CO., LTD.), etc.

The transparent substrate may be composed of glass or other transparent organic crystal substrates, or organic material like plastics. Since the fifth embodiment of the invention forms silicon dioxide film through lamination process, film having uniform thickness can be produced regardless of the superficial shape of the substrate, and therefore, the fifth embodiment also allows formation of film of uniform thickness not only on the plane transparent substrates, but on transparent substrates having concaves and convexes on the surface. Furthermore, the fifth embodiment is effectively applicable to such substrate composed of polycarbonate resin or acrylic resin as well. In this case, in order to produce colored film having sufficient adhesive strength, it is desirable that the surface of the organic transparent substrate is initially coated with at least a kind of silicon compound selected from a group consisting of organic silicon compound composed of silane-coupling agent, hydrolyzate thereof and colloidal silica, and then immersed in the processing solution before eventually forming the silicon dioxide film containing organic colorant.

SIXTH EMBODIMENT

The sixth embodiment of the invention is materialized by coating the surface of transparent substrate with silicon dioxide film containing organic colorant such as organic dyestuff or pigment.

To implement this, there is a conventional art called "sol-gel" method in which the transparent substrate is contacted with the solution containing hydrolyzed of metal alkoxide having organic colorant.

For example, this prior art is reported in a technical paper "J. Non-Cryst. Solids, 74 (1985), 395" describing the application of fluorescent organic colorant to the silicon dioxide film. Another technical paper "Ceramics, 21, No. 2, 1986, 111" proposes the doping of organic molecules into non-crystal quartz by the sol-gel method.

Nevertheless, it is necessary for the sol-gel method to thermally treat the formed film in the final production stage to fix the film to the substrate, and yet, since the produced film cannot thermally be treated by applying high temperature which causes the internal organic colorant to easily be decomposed, the produced film unavoidably becomes porous. And also, in the sol-gel method, such organic colorant which is easily decomposed on receipt of thermal treatment under a low temperature cannot be introduced to the film. Furthermore, in the sol-gel method the heat treatment is obliged to be carried out under a low temperature, so that the problem inherent to the sol-gel method is aggravated. Namely, impurities such as undecomposed raw material or solvent remain in the film. Another problem of the sol-gel method is that since the it uses expensive metal alkoxide as the starting raw material, the film production cost becomes high. Also, since in the sol-gel method the dip-coating method is adopted, the method cannot be applied to a substrate having complex configuration.

The sixth embodiment of the present invention utilizes a method for forming silicon dioxide film containing organic colorant such as dyestuff or pigment on the transparent substrate in which the substrate is contacted with processing solution prepared by adding organic colorant such as dyestuff or pigment to hydrosilicofluoric acid solution supersaturated with silicon dioxide. The hydrosilicofluoric acid solution containing supersaturated silicon dioxide can be prepared by adding boric acid, aqueous ammonia, metal halide or metal of which ionization tendency is greater than that of hydrogen to the hydrosilicofluoric acid solution saturated with silicon dioxide. Alternatively, the hydrosilicofluoric acid solution supersaturated with silicon dioxide can be prepared by raising temperature of the solution after adding silicon dioxide to the hydrosilicofluoric acid solution held at a low temperature (this is called "temperature-differentiation method"). Water-soluble organic colorant can directly be added to the above solution. Water-insoluble organic colorants can also be added to the solution after being dissolved in water-miscible organic solvent like alcohol. The organic colorant can be added to the hydrosilicofluoric acid solution saturated with silicon dioxide or it may also be added to the solution after the solution is supersaturated with silicon dioxide. In the sixth embodiment, the concentration of hydrosilicofluoric acid is not less than 1.0 mol/L, desirably from 1.5 to 3.0 mol/L is used. The temperature of the processing solution at the time of contact with the transparent substrate is from 15° to 60° C., desirably from 25° to 40° C. When the temperature-differentiation method is applied, normally, silicon dioxide is saturated at not more than 10° C. And then, the transparent substrate is contacted with the processing solution of the temperature not less than 20° C., desirably from 40° to 60° C. Generally, the transparent substrate is contacted with the processing solution while being disppersed and stirred in the solution.

Example of organic colorants are dyestuffs and pigments such as DIACELLITON FAST RED R (a product of MITSUBISHI CHEMICAL INDUSTRIES LTD.), BLUE 5P (a product of NIPPON KAYAKU Co., LTD.), RHODAMINE 6G, FLUORESCEIN, MALACHITE GREEN (a product of HODOGAYA CHEMICAL CO., LTD.), COUMATINE 6, SULFORHODAMINE B, RHODAMINE 19, RHODAMINE 110, RHODAMINE 116, RHODAMINE 123, KAYACYL YELLOW GG (a product of NIPPON KAYAKU CO., LTD.), RED 21P (a product of NIPPON KAYAKU CO., LTD.), ACRYDINE RED, KAYACYL RHODAMINE FB (a product of NIPPON KAYAKU CO., LTD.), RED 3P (a product of NIPPON KAYAKU CO., LTD.), VICTORIA BLUE BH (a product of HODOGAYA CHEMICAL CO., LTD.), ALIZARINE ASTROL (a product of TOKYO KASEI K.K.), METHYL VIOLET PURE SP (a product of HODOGAYA CHEMICAL CO., LTD.), GREEN 10P (a product of NIPPON KAYAKU CO., LTD.), etc.

The transparent substrate may be composed of glass or other transparent organic crystal substrates, or organic material like plastics. Since the sixth embodiment of the invention forms silicon dioxide film through lamination process, film having uniform thickness can be produced regardless of the superficial shape of the substrate, and therefore, the sixth embodiment also allows formation of film of uniform thickness not only on the plane transparent substrates, but on transparent substrates having concaves and convexes on the surface. Furthermore, the sixth embodiment is effectively applicable to such substrate composed of polycarbonate resin or acrylic resin as well. In this case, in order to produce colored film having sufficient adhesive strength, it is desirable that the surface of the organic transparent substrate is initially coated with at least a kind of silicon compound selected from a group consisting of organic silicon compound composed of silane-coupling agent, hydrolyzate thereof and colloidal silica, and then immersed in the processing solution before eventually forming the silicon dioxide film containing organic colorant.

In particular, the sixth embodiment can enhance the decorative effect by providing a colored and colorless portions to a mirror of which configurations show themselves like characters, numerals, figures, or patterns, wherein the colored and colorless portions are provided by forming silicon dioxide film on the substrate on which a mask is applied before film forming, and thereafter metal film is formed on the silicon dioxide film.

In this case, the figurative portion may be present in either of the colored and the colorless portions. Furthermore, the partially colored mirror is obtained by forming silicon dioxide film on the whole surface of the transparent substrate and applying a mask on the film, and thereafter removing the film not masked by chemical etching or mechanical abrasion.

SEVENTH EMBODIMENT

The seventh embodiment of the present invention utilizes a method for forming silicon dioxide film containing organic colorant such as dyestuff or pigment on glass having concaves and convexes in which the glass is contacted with processing solution prepared by adding organic colorant such as dyestuff or pigment to hydrosilicofluoric acid solution supersaturated with silicon dioxide. The hydrosilicofluoric acid solution containing supersaturated silicon dioxide can be prepared by adding boric acid, aqueous ammonia, metal halide or metal of which ionization tendency is greater than that of hydrogen to the hydrosilicofluoric acid solution saturated with silicon dioxide. Alternatively, the hydrosilicofluoric acid solution supersaturated with silicon dioxide can be prepared by raising temperature of the solution after adding silicon dioxide to the hydrosilicofluoric acid solution held at a low temperature (this is called "temperature-differentiation method"). Water-soluble organic colorants can directly be added to the above solution. Water-insoluble organic colorants can also be added to the solution after being dissolved in water-miscible organic solvent like alcohol. Organic colorants can be added to the hydrosilicofluoric acid solution saturated with silicon dioxide or it may also be added to the solution after the solution is supersaturated with silicon dioxide. In the seventh embodiment, the concentration of hydrosilicofluoric acid is not less than 1.0 mol/L, desirably from 1.5 to 3.0 mol/L is used. The temperature of the processing solution at the time of contact with the glass is from 15° to 60° C., desirably from 25° to 40° C. When the temperature-differentiation method is applied, normally, silicon dioxide is saturated not more than 10° C. And then, the glass is contacted with the processing solution of the temperature not less than 20° C., desirably from 40° to 60° C. Generally, the glass is contacted with the processing solution while being dispersed and stirred in the solution.

Example of organic colorants are dyestuffs and pigments such as DIACELLITON FAST RED R (a product of MITSUBISHI CHEMICAL INDUSTRIES LTD.), BLUE 5P (a product of NIPPON KAYAKU CO., LTD.), RHODAMINE 6G, FLUORESCEIN, MALACHITE GREEN (a product of HODOGAYA CHEMICAL CO., LTD.), COUMARINE 6, SULFORHODAMINE B, RHODAMINE 19, RHODAMINE 110, RHODAMINE 116, RHODAMINE 123, KAYACYL YELLOW GG (a product of NIPPON KAYAKU CO., LTD.), RED 21P (a product of NIPPON KAYAKU CO., LTD.), ACRDINE RED, KAYACYL RHODAMINE FB (a product of NIPPON KAYAKU CO., LTD.), RED 3P (a product of NIPPON KAYAKU CO., LTD.), VICTORIA BLUE BH (a product of HODOGAYA CHEMICAL CO., LTD.), ALIZARINE ASTROL (a product of TOKYO KASEI K.K.), METHYL VIOLET PURE SP (a product of HODOGAYA CHEMICAL CO., LTD.), GREEN 10P (a product of NIPPON KAYAKU CO., LTD.), etc.

The seventh embodiment of the invention is effectively applicable to those glass substrates having concaves and convexes on the surface including the following: templane glass sheets or plane glass sheets which are initially coated with colored melted glass solution having low melting point by providing figurative pattern and finally solidified, mechanically processed glass such as ground glass or sand-blasted glass, or such glass having the surface etched with anyone of hydrofluoric acid solutions, where most of these glass sheets having concaves and convexes surface are used for decoration, elimination of see-through visibility, and glare-proof.

EIGHTH EMBODIMENT

Inventors followed up study on the aforementioned problems related to the technique of coloring on the metallic surface. As a result, inventors successfully produced a colored film which were chemically and mechanically stable by forming a silicon dioxide film containing organic colorant on an inorganic film which were previously provided on a metal substrate, wherein characteristics of organic colorants, i.e., a wide variety of sorts of color and brilliancy of colors were made best use of. An thus, inventors eventually achieved the eight embodiment of the present invention which almost solves those problems inherent to conventional art.

When implementing the above novel art, inorganic compound film can be composed of the superficial oxidized layer or sulfurated layer prepared by chemical treatment for the metal surface. The inorganic compound film may also be composed of anode-oxidized layer that can be formed electrochemically. To modify the metal surface, conventional chemical treatment and anode oxidation treatment are available. In place of the modified surface layer mentioned above, inorganic compound film formed on the metal surface can be available. In this case, as inorganic compound, majority of inorganic compound including oxides such as $SiO_2$, $TiO_2$, $ZrO_2$, $Fe_2O_3$, $Cr_2O_3$, $Al_2O_3$, $CoO$, $Co_2O_3$, $NiO$, and $Ta_2O_3$; carbides such as $SiC$ and $TiC$; nitride such as $Si_3N_4$, $TiN$ and $CrN$. However, in light of the decorative effect, that is, metal skin visibility, it is desirable that oxides having good light permeability are used. On the other hand, taking the adhesiveness to the silicon dioxide film containing organic colorant into account, inorganic compounds containing silicon such as $SiO_2$, $SiO$, $Si_3N_4$, or metallic silicide are preferred. Needless to say, any of these inorganic compounds can be used alone, and also mixture thereof can be used.

Furthermore, the eighth embodiment of the invention allows the use of film composed of any of those inorganic compounds dispersed in organic material.

Any of the conventional film formation methods such as spraying method, CVD method, dipping method, vacuum deposition method, sputtering method, ion-plating method, or plating method, can be used for forming such inorganic compounds mentioned above.

These conventional method are well known to the persons pertain to the art, and therefore, detail explanation is omitted.

As is conventionally suggested, however, it is desirable, that dispersion plating method is used for the formation of organic film containing medium composed of inorganic compound, i.e., complex film.

As metal substrate, not only genuine metal substance, but also a substrate composed of inorganic or organic material of which surface coated with metallic film can be used. There is no limitation to the configuration available for these substrates. Examples of the configuration are plane shape, curved shape, shpere, or fine particle, and the like.

As to the film formation of silicon dioxide containing, the eighth embodiment of the invention utilizes a method for forming silicon dioxide film containing organic colorant such as dyestuff or pigment on the metal substrate coated with inorganic compound in advance in which the metal substrate is contacted with processing solution prepared by adding organic colorant such as dyestuff or pigment to hydrosilicofluoric acid solution supersaturated with silicon dioxide. The hydrosilicofluoric acid solution containing supersaturated silicon dioxide can be prepared by adding boric acid, aqueous ammonia, metal halide or metal of which ionization tendency is greater than that of hydrogen to the hydrosilicofluoric acid solution saturated with silicon dioxide. Alternatively, the hydrosilicofluoric acid solution supersaturated with silicon dioxide can be prepared by raising temperature of the solution after adding silicon dioxide to the hydrosilicofluoric acid solution held at a low temperature (this is called "temperature-differentiation method"). Water-soluble organic colorants can directly be added to the above solution. Water-insoluble organic colorants can also be added to the solution after being dissolved in water-miscible organic solvents like alcohol. Organic colorants can be added to the hydrosilicofluoric acid solution saturated with silicon dioxide or it may also be added to the solution after the solution is supersaturated with silicon dioxide. In the eighth embodiment, the concentration of hydrosilicofluoric acid is not less than 1.0 mol/L, desirably from 1.5 to 3.0 mol/L is used. The temperature of the processing solution at the time of contact with the metal is from 15° to 60° C., desirably from 25° to 40° C. When the temperature-differentiation method is applied, normally, silicon dioxide is saturated at not more than 10° C. And then, the metal is contacted with the processing solution of the temperature at not less than 20° C., desirably from 40° to 60° C. Generally, the metal is contacted with the processing solution while being dispersed and stirred in the solution.

Examples of organic colorants are dyestuffs and pigments such as DIACELLITON FAST RED R (a product of MITSUBISHI CHEMICAL INDUSTRIES LTD.) BLUE 5P (a product of NIPPON KAYAKU CO., LTD.), RHODAMINE 6G, FLUORESCEIN, MALACHITE GREEN (a product of HODOGAYA CHEMICAL CO., LTD.), COUMARINE 6, SULFORHODAMINE B, RHODAMINE 19, RHODAMINE 110, RHODAMINE 116, RHODAMINE 123, KAYACYL YELLOW GG (a product of NIPPON KAYAKU CO., LTD.), RED 21P (a product of NIPPON KAYAKU CO., LTD.), ACRDINE RED, KAYACYL RHODAMINE FB (a product of NIPPON KAYAKU CO., LTD.), RED 3P (a product of NIPPON KAYAKU CO., LTD.), VICTORIA BLUE BH (a product of HODOGAYA CHEMICAL CO., LTD.), ALIZARINE ASTROL (a product of TOKYO KASEI K.K.), METHYL VIOLET PURE SP (a product of HODOGAYA CHEMICAL CO., LTD.), GREEN 10P (a product of NIPPON KAYAKU CO., LTD.), etc.

NINTH EMBODIMENT

Inventors followed up study on the aforementioned problems related to the covering glass sheets available for clocks and wrist watches, and finally found that coloration of these covering glass sheets was achieved without problem by bringing the covering glass complete with the chemical strengthening process into contact with the processing solution prepared by adding organic colorant to the hydrosilicofluoric acid solution containing supersaturated silicon dioxide. The hydrosilicofluoric acid solution containing supersaturated silicon dioxide can be prepared by adding boric acid, aqueous ammonia, metal halide or metal of which ionization tendency is greater than that of hydrogen to the hydrosilicofluoric acid solution saturated with silicon dioxide. Alternatively, the hydrosilicofluoric acid solution supersaturated with silicon dioxide can be prepared by raising temperature of the solution after adding silicon dioxide to the hydrosilicofluoric acid solution held at a low temperature (this is called "temperature-differentiation method"). Water-soluble organic colorants can directly be added to the above solution. Water-insoluble organic colorants can also be added to the solution after being dissolved in water-miscible organic solvent like alcohol. The organic colorant can be added to the hydrosilicofluoric acid solution saturated with silicon dioxide or it may also be added to the solution after the solution is supersaturated with silicon dioxide. In the ninth embodiment, the concentration of hydrosilicofluoric acid is not less than 1.0 mol/L, desirably from 1.5 to 3.0 mol/L is used. The temperature of the processing solution at the time of contact with the covering glass is from 15° to 60° C., desirably from 25° to 40° C. When the temperature-differentiation method is applied, normally, silicon dioxide is saturated at not more than 10° C. And then, the covering glass is contacted with the processing solution of the temperature at not less than 20° C., desirably from 40° C. to 60° C. Generally, the covering glass is contacted with the processing solution while being dispersed and stirred in the solution.

Example of organic colorants are dyestuffs and pigments such as DIACELLITON FAST RED R (a product of MITSUBISHI CHEMICAL INDUSTRIES LTD.), BLUE 5P (a product of NIPPON KAYAKU CO., LTD.), RHODAMINE 6G, FLUORESCEIN, MALACHITE GREEN (a product of HODOGAYA CHEMICAL CO., LTD.), COUMATINE 6, SULFORHODAMINE B, RHODAMINE 19, RHODAMINE 110, RHODAMINE 116, RHODAMINE 123, KAYACYL YELLOW GG (a product of NIPPON KAYAKU CO., LTD.), RED 21P (a product of NIPPON KAYAKU CO., LTD.), ACRDINE RED, KAYACYL RHODAMINE FB (a product of NIPPON KAYAKU CO., LTD.), RED 3P (a product of NIPPON KAYAKU CO., LTD.), VICTORIA BLUE BH (a product of HODOGAYA CHEMICAL CO., LTD.), ALIZARINE ASTROL (a product of TOKYO KASEI K.K.), METHYL VIOLET PURE SP (a product of HODOGAYA CHEMICAL CO., LTD.), GREEN 10P (a product of NIPPON KAYAKU CO., LTD.), etc.

In constrast with any conventional film produced by the sol-gel method, the silicon dioxide film containing organic colorant produced by executing these serial steps mentioned above is extremely dense without defects such as foams.

The ninth embodiment of the invention allows the formation of the silicon dioxide film containing organic colorant in the processing solution uniformly prepared. Since the reaction for the formation of the film goes on in the vicinity of the room temperature, the organic colorant in the solution is uniformly introduced into the film without decomposition.

Furthermore, since the silicon dioxide film formed by the ninth embodiment of the invention is extremely dense and firmly adheres to the substrate, no thermal treatment is required. Since the film is formed by precipitation from the supersaturated solution of silicon dioxide, the silicon dioxide film containing organic colorant achieved by the ninth embodiment of the invention is almost free from impurities such as undecomposed raw material or solvent.

Furthermore, since the film is formed by growing itself on the surface in the film forming process according to the ninth embodiment, uniform thickness of colored layer is formed even on the curved surface unlike the conventional coating method causing uneven thickness of colored layer.

Still further, it was found by the inventors that extremely durable and dense silicon dioxide film containing organic colorant was successfully formed under a low temperature (desirably in a range from 25° C. to 60° C.) which does not affect the chemically promoted strength. Inventors also found that the chemical durability was significantly improved chemical durability of organic colorant which was naturally lack of chemical durability by being contained in inorganic compound, i.e, silicon dioxide. Furthermore, as is typically represented by dyestuff or pigment, the organic colorant has a wide variety of available kinds of color and brilliancy, so that even those warm colors can easily be developed by effectively applying organic colorant which is not realized by the conventional method.

Application of organic fluorescent colors or photochromic colors significantly enhances the decorative function of clocks and wrist watches by means of the colored covering glass.

As is clear from the above description, the ninth embodiment of the invention has almost perfectly consummated the art of coloring glass substrate covering clocks and wrist watches of which realization is considered to be almost difficult.

DETAILED DESCRIPTION OF THE PREFERRED EMBODIMENTS

Figure 1:
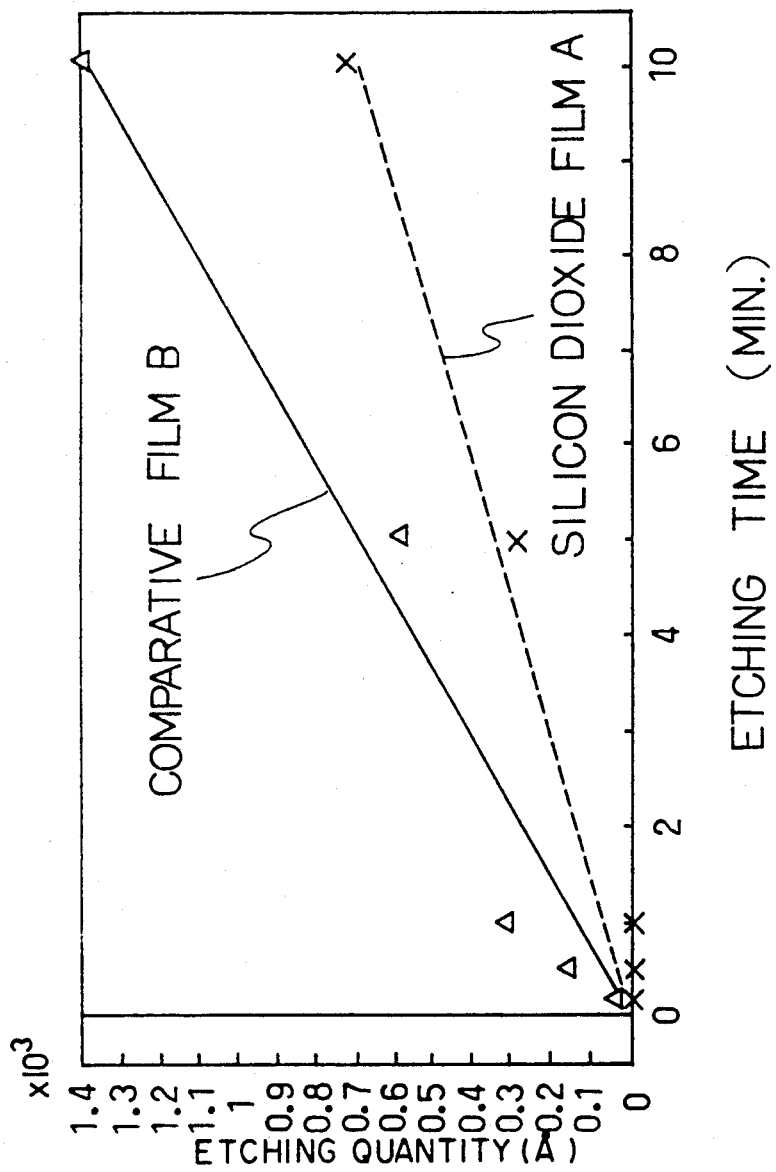
FIG. 1 is a graph showing the result of the etching the silicon dioxide film A containing organic colorant embodied by the invention and a comparative film B formed by the conventional method.

Referring more particularly to the following examples of the invention, the invention is described below. It should be understood that the invention is not merely defined to the following examples unless departing from the essential spirit and scope of the invention.

EXAMPLES OF THE INVENTION

Example 1

A plate of slide glass measuring 75 mm long, 25 mm wide, and 1 mm thick used as a test substrate which had been cleaned and dried completely.

Various kinds of dyestuffs were mixed or dissolved in distilled water at the room temperature to produce an amount of 5% by weight or saturated additive.

Processing solution was prepared by either adding 8 cc of 0.5 mol/L boric acid water solution to 100 cc of hydrosilicofluoric acid solution saturated with silica gel or dissolving 0.4 gram of metallic aluminium into the same hydrosilicofluoric acid solution. 1 cc of each liquid additive was mixed with 100 cc of the processing solution in a beaker which was in turn heated in a water bath at 35° C. after stirring. Then, the test substrates were immersed in respective processing solution and 16 hours later, removed out for cleaning and dryout.

The list of additive dyestuffs and the test result are shown in Table 2, in which the thickness of each silicon dioxide film formed was measured by a contacting probe type film thickness measuring instrument.

It was acknowledged through analysis with ESCA (Electron Spectroscopy for Chemical Analysis), SIMS (Secondary Ion Mass Spectrometry) and IR (Infrared Spectrophotometry), these organic dyestuffs were uniformly incorporated with their respective film.

In addition, each test substrate carrying the film of silicon dioxide was kept immersed in a solution of 99.5% ethanol for 24 hours, which result in no elution of the dyestuffs. Also, no peeling-off of the silicon dioxide film from the substrate was detected during tape test and a sponge rubbing test.

TABLE 2

| Additive dyestuffs | Film thickness ( Å ) | Color tone |
|---|---|---|
| KAYACYL YELLOW GG | 6055 | Light yellow |
| MALACHITE GREEN | 6345 | Green |
| ALIZARINE ASTROL | 8370 | Light purple |

Example 2

A plate of slide glass measuring 75 mm long, 25 mm wide, and 1 mm thick was used as a test substrate which had been cleaned and dried completely.

Each of laser colorants was mixed with or dissolved in distilled water at the room temperature to produce an amount of 5% by weight or saturated liquid additive. Also, processing solution was prepared by either adding 8 cc of 0.5 mol/L boric acid water solution to 100 cc of hydrosilicofluoric acid solution saturated with silica gel or dissolving 0.4 g of metallic aluminium into the same hydrosilicofluoric acid solution. 1 cc of each liquid additive was mixed with 100 cc of the processing solution in a beaker which was in turn heated in a water bath at 35° C. after stirring. Then, the test substrates were immersed in respective processing solution and 16 hours later, removed out for cleaning and dryout.

The list of additive laser colorants and the test result are shown in Table 3, in which the thickness of each silicon dioxide film formed was measured by a contacting probe type film thickness measuring instrument.

It was acknowledged through analysis with ESCA, SIMS, and IR that the laser colorants were uniformly incorporated with their respective thin films. As to RHODAMINE 6G, fluorescence spectrum around 600 nm was detected, so that it was confirmed that it had a function of laser colorant. In addition, each test substrate carrying the film of silicon dioxide was kept immersed in a solution of 99.5% ethanol for 24 hours, which resulted in no elution of the dyestuffs. Also, no peeling-off of the silicon dioxide film from the substrate was detected during a tape test and a sponge rubbing test.

TABLE 3

| Laser colorants | Film thickness (Å) | Color tone |
| --- | --- | --- |
| RHODAMINE 6G | 1170 | Red |
| ACRDINE RED | 905 | Red |
| FLUORESCEIN | 4285 | Yellow |

Example 3

A plate of slide glass measuring 75 mm long, 25 mm wide, and 1 mm thick was used as a test substrate which had been cleaned and dried completely.

Each of laser colorants was mixed with or dissolved in distilled water at the room temperature to produce an amount of 5 wt % or saturated liquid additive. Also, processing solution was prepared by either adding 8 cc of 0.5 mol/L boric acid water solution to 100 cc of hydrosilicofluoric acid solution saturated with silica gel or dissolving 0.4 g of metallic aluminium into the same hydrosilicofluoric acid solution. 1 cc of each liquid additive was mixed with 100 cc of the processing solution in a beaker which was in turn heated in a water bath at 35° C. after stirring. Then, the test substrates were immersed in respective processing solution and 16 hours later, removed out for cleaning and dryout.

The list of additive laser colorants and the test result are shown in Table 4, in which the thickness of each silicon dioxide film formed was measured by a contacting probe type film thickness measuring instrument.

It was acknowledged through analysis with ESCA, SIMS, and IR that the laser colorants were uniformly incorporated with their respective thin films. Fluorescence was detected from each film containing colorant by radiating excitation light for each colorant contained in the film, so that it was confirmed that each colorant had function of laser colorant. In addition, each test substrate carrying the film of silicon dioxide was kept immersed in a solution of 99.5% ethanol for 24 hours, which resulted in no elution of the dyestuffs. Also, no peeling-off of the silicon dioxide film from the substrate was detected during a tape test and a sponge rubbing test.

TABLE 4

| Laser colorants | Film thickness (Å) | Color tone |
| --- | --- | --- |
| RHODAMINE 110 | 5095 | Light orange |
| RHODAMINE 116 | 5275 | Orange |
| RHODAMINE B | 3660 | Red purple |
| RHODAMINE 123 | 3515 | Yellow |
| RHODAMINE 19 | 5005 | Red |
| RHODAMINE 6G | 3595 | Red |
| SULFORHODAMINE B | 1585 | Red purple |
| ACRDINE RED | 3868 | Red |

TABLE 4-continued

| Laser colorants | Film thickness (Å) | Color tone |
| --- | --- | --- |
| FLUORESCEIN | 4218 | Yellow |

Example 4

A plate of slide glass measuring 75 mm long, 25 mm wide, and 1 mm thick was used as a test substrate which had been cleaned and dried completely.

A portion of disperse dye known as Diaseritone First Red, a trade name (of Mitsubishi Chemical Industries, Ltd.) was dispersed in distilled water at the room temperature to produce an amount of 5 wt % liquid additive.

Processing solution was prepared by dissolving 0.4 g of metallic aluminium into 100 cc of hydrosilicofluoric acid solution saturated with silica gel. The processing liquid was mixed together with 1 cc of the disperse dye in a beaker which was in turn heated in a water bath at 35° C. after stirring. Then, the test substrate was immersed in the processing liquid and 16 hours later, removed out for cleaning and dryout.

As the result, a film of silicon dioxide in red color was formed on the substrate having a thickness of 7605 Å measured with a contacting probe type film thickness measuring instrument.

It was then acknowledged through analysis with ESCA, SIMS, and IR that the disperse dye was uniformly incorporated with the thin film. In addition, the test substrate carrying the film of silicon dioxide was kept immersed in a solution of 99.5% ethanol for 24 hours, which resulted in no elution of the disperse dye.

Also, no peeling-off of the silicon dioxide film from the substrate was detected during a tape test and a sponge rubbing test.

Example 5

A plate of slide glass measuring 75 mm long, 25 mm wide, and 1 mm thick was used as a test substrate which had been cleaned and dried completely.

A portion of RHODAMINE 6G (laser colorant) was mixed with or dissolved in distilled water at the room temperature to produce an amount of saturated or 5 wt % liquid additive.

Processing liquid was made by dissolving 0.4 g of metallic aluminium into 100 cc of hydrosilicofluoric acid solution saturated with silica gel. 100 cc of the processing liquid was mixed together with 1 cc of the liquid additive in a beaker which was in turn heated in a water bath at 35° C. after stirring. Then, the test substrate was immersed in the processing solution and 16 hours later, removed out for cleaning and dryout. A resultant thin film on the substrate was designated as a specimen A.

For the purpose of comparison, another thin film of organic substance containing silicon dioxide was made by a sol-gel method. There were provided 50 g of ethyl silicate [$Si(OC_2H_5)_4$], 75.2 g of ethanol [$C_2H_5OH$], 0.6 g of 35% hydrochloric acid, 47 g of water, and 0.1 g of RHODAMINE 6G which were all mixed up for one hour to produce a solution. After the solution was left aside for one hour, a test substrate was dipped in the solution and then pulled out by 1.5 mm/sec, so as to form a thin film thereon. The thin film was dried out at the room temperature in the atmosphere for about 16 hours and then, heated up at 110° C. for 7 hours. The substrate designated as a specimen B.

Etch-rate of silicon dioxide film of the specimens A and B were measured at a temperature of 22° C. using a solution of 1/10 diluted P-ETCH (48% HF:70% $HNO_3:H_2O = 3:2:60$).

The result is shown in FIG. 1, in which the specimen A is smaller in the etch-rate and thus, higher in density than B.

Example 6

A plate of slide glass measuring 75 mm long, 25 mm wide, and 1 mm thick was used as a test substrate which had been cleaned and dried completely.

Each of given dyestuffs different in property was mixed with or dissolved in distilled water at the room temperature to produce an amount of 5 wt % or saturated liquid additive. Also, processing liquid was made by either adding 8 cc of 0.5 mol/L boric acid water solution to 100 cc of hydrosilicofluoric acid solution saturated with silica gel or dissolving 0.4 g of metallic aluminium into the same hydrosilicofluoric acid solution. 1 cc of each dyestuffs additive liquid was mixed with 100 cc of the processing liquid in a beaker which was in turn heated in a water bath at 35° C. after stirring. Then, the test substrates were immersed in respective processing solutions and 16 hours later, removed out for cleaning and dryout.

The list of additive dyestuffs and the test result are shown in Table 6, in which the thickness of each silicon dioxide film formed was measured by a contacting probe type film thickness measuring instrument.

It was acknowledged through analysis with ESCA, SIMS, and IR that the dyestuffs were uniformly incorporated with their respective thin films. In addition, each test substrate carrying the film of silicon dioxide was kept immersed in a solution of 99.5% ethanol for 24 hours, which resulted in no elution of organic dyestuffs. Also, no peeling-off of the silicon dioxide film from the substrate was detected during a tape test and a sponge rubbing test.

TABLE 6

| Additive dyestuffs | Film thickness ( Å ) | Color tone |
|---|---|---|
| KAYACYL RHODAMINE FB | 4200 | Red |
| METHYL VIOLET PURE SP | 7700 | Light blue |
| VICTORIA PURE BLUE BOH | 4700 | Yellow green |
| VICTORIA BLUE BH | 8100 | Blue green |

Example 7

A plate of slide glass measuring 75 mm long, 25 mm wide, and 1 mm thick was used as a test substrate which had been cleaned and dried completely.

Each of given dyestuffs was mixed with or dissolved in distilled water at the room temperature to produce an amount of 5 wt % or saturated liquid additive. Also, processing solution was prepared by either adding 8 cc of 0.5 mol/L boric acid water solution to 100 cc of hydrosilicofluoric acid solution saturated with silica gel or dissolving 0.4 g of metallic aluminium into the same hydrosilicofluoric acid solution. 1 cc of each liquid additive was mixed with 100 cc of the processing solution in a beaker which was in turn heated in a water bath at 35° C. after stirring. Then, the test substrates were immersed in respective processing solution and 16 hours later, removed out for cleaning and dryout.

The list of additive dyestuffs and the test result are shown in Table 7, in which the thickness of each silicon dioxide film formed was measured by a contacting probe type film thickness measuring instrument.

It was acknowledged through analysis with ESCA, SIMS, and IR that the dyestuffs were uniformly incorporated with their respective thin films. In addition, each test substrate carrying the film of silicon dioxide was kept immersed in a solution of 99.5% ethanol for 24 hours, which resulted in no elution of dyestuffs. Also, no peeling-off of the silicon dioxide film from the substrate was detected during a tape test and a sponge rubbing test.

TABLE 7

| Additive dyestuffs | Film thickness ( Å ) | Color tone |
|---|---|---|
| BLUE 5P | 2000 | Blue |
| RED 21P | 6800 | Light yellow |
| RED 3P | 7200 | Light red |
| GREEN 10P | 2900 | Yellow green |

Example 8

A plate of slide glass measuring 75 mm long, 25 mm wide, and 1 mm thick was used as a test substrate which had been cleaned and dried completely.

Each of different laser colorant was mixed with or dissolved in distilled water at the room temperature to produce an amount of 5% by weight or saturated liquid additive. Also, processing liquid was made by either adding 8 cc of 0.5 mol/L boric acid water solution to 100 cc of hydrosilicofluoric acid solution saturated with silica gel or dissolving 0.4 g of metallic aluminium into the same hydrosilicofluoric acid solution. 100 cc of the processing solution was mixed with 1 cc of each colorant additive liquid in a beaker which was in turn heated in a water bath at 35° C. after stirring. Then, the test substrates were immersed in respective processing solutions and 16 hours later, removed out for cleaning and dryout.

The list of additive laser colorants and the test result are shown in Table 8, in which the thickness of each silicon dioxide film developed was measured by a contacting probe type film thickness measuring instrument.

It was acknowledged through analysis with ESCA, SIMS, and IR that the laser colorants were uniformly incorporated with their respective thin films. When a beam of excitation light was applied to each thin film associated with a laser colorant, fluorescent light emitted displaying the function of the laser colorant. In addition, each test substrate carrying the film of silicon dioxide was kept immersed in a solution of 99.5% ethanol for 24 hours, which resulted in no elution of the colorants. Also, no peeling-off of the silicon dioxide film from the substrate was detected during a tape test and a sponge rubbing test.

TABLE 8

| Laser colorants | Film thickness ( Å ) | Color tone |
|---|---|---|
| 2,5-diphenyloxazole | 3840 | Colorless |
| 1,4-bis[2-(5-phenyl-oxazolyl)]benzene | 5840 | Colorless |
| 2-(1-naphthyl)-5-phenyloxazole | 5080 | Colorless |
| COUMARIN 6 | 4800 | Dark orange |
| NK-125 | 1500 | Light green |

Example 9

A plate of slide glass measuring 75 mm long, 25 mm wide, and 1 mm thick was used as a test substrate which had been cleaned and dried completely.

Processing solution was made by dissolving 0.4 g of metallic aluminium into 100 cc of hydrosilicofluoric acid solution saturated with silica gel. 0.01 g of each of given dyestuffs was mixed with 100 cc of the processing solution in a beaker which was in turn heated in a water bath at 35° C. after proper stirring. TG-21 was first mixed with a concentrated acetic acid solution and added to the processing solution. Then, the test substrates were immersed in respective processing solution and 16 hours later, removed out for cleaning and dryout.

The list of additive dyestuffs and the test result are shown in Table 9, in which the thickness of each silicon dioxide film formed was measured by a contacting probe type film thickness measuring instrument.

It was acknowledged through analysis with ESCA, SIMS, and IR that the dyestuffs were uniformly incorporated with their respective thin films. In addition, each test substrate carrying the film of silicon dioxide was kept immersed in a solution of 99.5% ethanol for 24 hours, which resulted in no elution of the dyestuffs. Also, no peeling-off of the silicon dioxide film from the substrate was detected during a tape test and a sponge rubbing test.

TABLE 9

| Additive dyestuffs | Film thickness ( Å ) | Color tone |
| --- | --- | --- |
| TG 21 | 5600 | Black |
| PSD-HR | 4700 | Red |
| PSD-O | 10400 | Orange |

Example 10

A plate of slide glass measuring 75 mm long, 25 mm wide, and 1 mm thick was used as a test substrate which had been cleaned and dried completely.

Processing solution was made by dissolving 0.4 g of metallic aluminium into 100 cc of hydrosilicofluoric acid solution saturated with silica gel. 0.05 g of each of given dyestuff was mixed with 100 cc of the processing solution in a beaker which was in turn heated in a water bath at 35° C. after proper stirring. Then, the test substrates were immersed in respective processing solution and 16 hours later, removed out for cleaning and dryout.

The list of additive dyestuffs and the test result are shown in Table 10, in which the thickness of each silicon dioxide film formed was measured by a contacting probe type film thickness measuring instrument.

It was acknowledged through analysis with ESCA, SIMS, and IR that the dyestuffs were uniformly incorporated with their respective thin films. In addition, each test substrate carrying the film of silicon dioxide was kept immersed in a solution of 99.5% ethanol for 24 hours, which resulted in no elution of the dyestuff. Also, no peeling-off of the silicon dioxide film from the substrate was detected during a tape test and a sponge rubbing test.

TABLE 10

| Additive dyestuffs | Film thickness ( Å ) | Color tone |
| --- | --- | --- |
| TPP | 4900 | Yellow green |
| NK-78 | 2600 | Colorless |
| NK-123 | 3000 | Yellow |
| NK-863 | 3800 | Colorless |
| NK-1144 | 4200 | Light yellow |
| NK-1331 | 960 | Colorless |

Example 11

A plate of slide glass measuring 75 mm long, 25 mm wide, and 1 mm thick was used as a test substrate which had been cleaned and dried completely.

Each of given dyestuffs was mixed with or dissolved into distilled water at the room temperature to produce an amount of 5% by weight or saturated liquid additive. Also, processing solution was made by dissolving 0.4 g of metallic aluminium into 100 cc of hydrosilicofluoric acid solution saturated with silica gel. 100 cc of the processing solution was mixed with 1 cc of each dyestuff additive liquid in a beaker which was in turn heated in a water bath at 35° C. after stirring. Then, the test substrates were immersed in respective processing solution and 16 hours later removed out for cleaning and dryout.

The list of additive dyestuff and the test result are shown in Table 11, in which the thickness of each silicon dioxide film formed was measured by a contacting probe type film thickness measuring instrument.

It was acknowledged through analysis with ESCA, SIMS, and IR that the dyestuffs were uniformly incorporated with their respective thin films. In addition, each test substrate carrying the film of silicon dioxide was kept immersed in a solution of 99.5% ethanol for 24 hours, which resulted in no elution of the dyestuff. Also, no peeling-off of the silicon dioxide film from the substrate was detected during a tape test and a sponge rubbing test.

TABLE 11

| Additive dyestuffs | Film thickness ( Å ) | Color tone |
| --- | --- | --- |
| RED T-BLH | 1100 | Light pink |
| RED GTLH | 2800 | Light pink |
| BLUE T-BLH | 500 | Purple |
| YELLOW T-RLH | 1500 | Light yellow |
| YELLOW 7 GLH | 2900 | Dark yellow |
| 10GFH | 1450 | Yellow green |
| BLACK MH | 4000 | Bronze |
| BLACK CD-BLH | 1000 | Yellow |
| BLACK SH | 350 | Black |

Example 12

A plate of slide glass measuring 75 mm long, 25 mm wide, and 1 mm thick was used as a test substrate which had been cleaned and dried completely.

Each of given laser colorants was dissolved into ethanol at the room temperature to produce an amount of 0.01 mol/l or saturated liquid additive. Also, processing solution was made by dissolving 0.4 g of metallic aluminium into 100 cc of hydrosilicofluoric acid solution saturated with silica gel. 100 cc of the processing solution was mixed with 1 cc of each colorant solution in a beaker which was in turn heated in a water bath at 35° C. after stirring. Then, the test substrates were immersed in respective processing solution and 16 hours later, removed out for cleaning and dryout.

The list of additive laser colorants and the test result are shown in Table 12, in which the thickness of each silicon dioxide film developed was measured by a contacting probe type film thickness measuring instrument.

It was acknowledged through analysis with ESCA, SIMS, and IR that the laser colorants were uniformly incorporated with their respective thin films. When a beam of excitation light was applied to each thin film associated with a laser colorant, fluorescent light emitted displaying the function of the laser colorant. In addition, each test substrate carrying the film of silicon dioxide was kept immersed in a solution of 99.5% ethanol for 24 hours, which resulted in no elution of the laser colorant. Also, no peeling-off of the silicon dioxide film from the substrate was detected during a tape test and a sponge rubbing test.

TABLE 12

| Laser colorants | Film thickness (Å) | Color tone |
|---|---|---|
| COUMARIN 504 | 7700 | Yellow |
| COUMARIN 521 | 8800 | Yellow |
| COUMARIN 523 | 8500 | Colorless |
| COUMARIN 525 | 8750 | Orange |
| COUMARIN 535 | 8300 | Colorless |
| COUMARIN 540A | 7100 | Light yellow |
| FLUOL 555 | 8300 | Yellow |

Accordingly, the present invention provides the following advantages:

1. The formed thin film of silicon dioxide containing an organic colorant is improved in density, allowing no defect such as air bubbles to be developed therein.
2. The fabrication of silicon dioxide thin films associated with organic colorant is carried out at about the room temperature without heat-up process at a high temperature and thus, applicable for making a thin film of thermally decomposable organic colorant.
3. The silicon dioxide thin film containing an organic coloring agent includes a less amount of impurities.
4. The materials to be used are less in price, reducing the cost of production.
5. The silicon dioxide thin film containing an organic colorant can be formed on any substrate of complex shape.

EXAMPLES OF THE FIRST EMBODIMENT

The first embodiment of the present invention will be described in detail. It should also be understood that the first embodiment of the present invention is not limited to the examples without departing the scope thereof.

Example 13

A polyethylene terephthalate film known as "OP-3" (of Teijin Limited), which is 100 mm in length and width and 100 μm in thickness (and at one side, provided with a resin primer layer of 0.1 μm thickness) was immersed in a solution (containing about 0.9% by weight of silicon compound) made by dissolving a mixture (D/C=0.22) of 1.5 g of γ-methacryloxypropyltrimethoxysilane and 3 g of CSGL-0803P (a hydrolysis of tetraethoxysilane available from CHISSO CORPORATION, having a solid substance of 8% in concentration) into 250 ml of a mixture solvent medium comprising ethanol, isopropyl alcohol, and n-butyl alcohol at a (volume) ratio of 5:3:2. The polyethylene terephthalate film was then removed out at a speed of 15 cm/min and dried out at 50° C. with a hot dryer oven for an hour. In the same process, a thin film of silicon compound was formed on a glass substrate and its thickness was about 10 nm.

Figure 2:
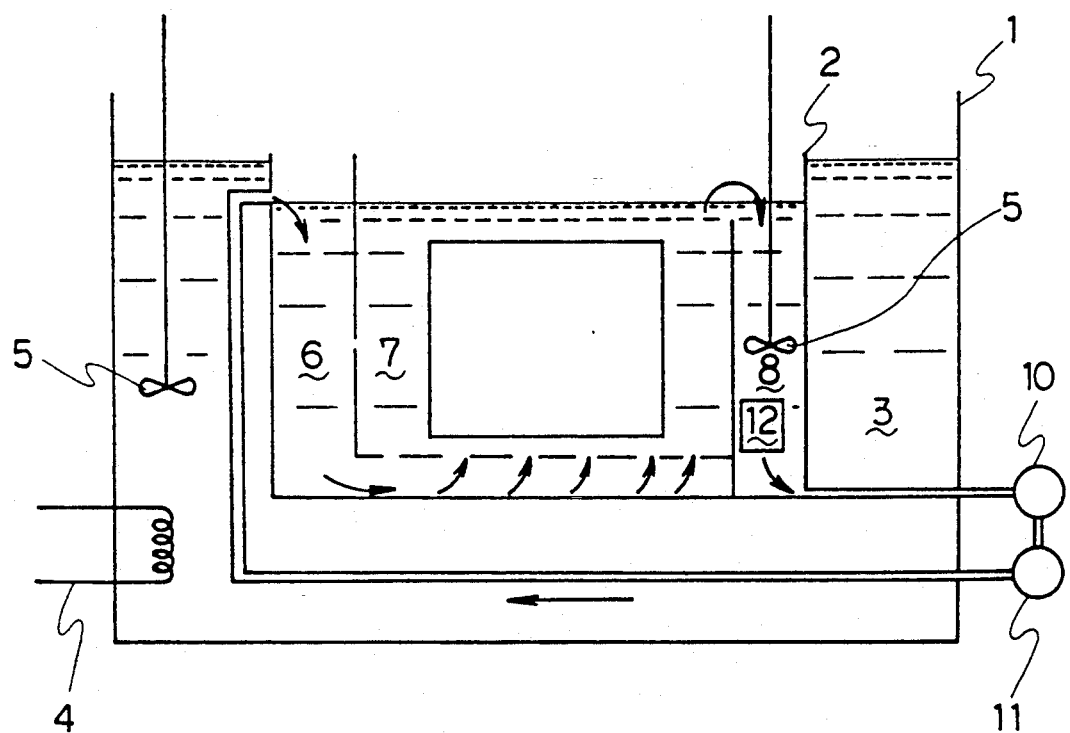
FIG. 2 is the schematic illustration of the silicon-dioxide film forming apparatus employed for embodying the invention.

The "OP-3" film coated with an organic silicon compound layer was used with an apparatus of making silicon dioxide thin film, as shown in FIG. 2, for developing thereon color layers of silicon dioxide thin film containing organic coloring agents listed in Table 13.

TABLE 13

| Additive dyestuffs | Film thickness (Å) | Color tone |
|---|---|---|
| KAYACYL YELLOW GG | 5700 | Light yellow |
| RED 21P | 8350 | Light yellow |
| KAYACYL RHODAMINE FB | 3400 | Red |
| RED 3P | 7390 | Light red |
| VICTORIA BLUE BH | 8950 | Blue green |
| VICTORIA PURE BLUE BOH | 5300 | Yellow green |
| MALACHITE GREEN | 5950 | Green |
| GREEN 10P | 4000 | Yellow green |
| METHYL VIOLET PURE | 7750 | Light blue |
| BLUE SP | 2100 | Blue |
| ALIZARINE ASTROL | 8100 | Light purple |

In FIG. 2, an immersing tank comprises an outer tank 1 and an inner tank 2, being filled with water 3 between the outer and inner tanks 1 and 2. The water 3 remains heated to 40° C. by a heater 4 and stirred for uniform thermal dispersion. The inner tank 2 comprises a front section 6, an intermediate section 7, and a rear section 8, each section being filled with 6.5 liters of 2.5 mol/l hydrosilicofluoric acid solution with dissolution and saturation of silicon dioxide of which source of supply was industrial silica gel powder. Further, the solution was added with a water solution having 5% by weight of a dyestuffs listed in Table 1 1 cc per 100 cc of hydrosilicofluoric acid solution. The coloring of the substrate was carried out for each dyestuff processing solution which was replaced with new one in each cycle of the operation.

The coloring operation was commenced with a circulation pump 10 actuated for circulating the water solution from the rear section 8 of the inner tank 2 through a filter 11 back to the front section 6.

Three plates of aluminium 12 measuring 50 mm long, 50 mm wide, and 3 mm thick were immersed into the solution of the rear section 8 and maintained for 10 hours. Then, the solution was turned to a proper processing solution containing a desired supersaturaing rate of $SiO_2$. The filter 11 was adjusted to 1.5 μm in absolute filtering rate and the circulating flow of the processing solution was set to 520 ml/min (namely about 8%/min since the total volume of the processing solution was about 6.5 liters). The plastic substrate coated with silicon compound, namely, "OP-3" film 9 was immersed vertically into the solution of the intermediate section 7 of inner tank and maintained for 16 hours under the foregoing condition (namely, the solution was circulated at about 8%/min through the 1.5 μm filter 11 with three of the aluminium plates remaining immersed) before removed out for cleaning and dryout.

The list of employed dyestuffs and the test result are shown in Table 13, in which the thickness of each silicon dioxide film formed was measured by a contacting probe type film thickness measuring instrument.

It was acknowledged through the analysis with Electron Spectroscopy for Chemical Analysis (ESCA), Secondary Ion Mass Spectrometry (SIMS), and Infrared spectrophotometry (IR) that the organic dyestuffs were uniformly incorporated with their respective thin films. In addition, each test substrate carrying the film of silicon dioxide was kept immersed in a solution of 99.5% ethanol for 24 hours, which resulted in no elution of the organic dyestuff.

The dyestuffs containing silicon dioxide films developed on both the sides of the substrate which had been coated with no resin primer layers, were easily peeled off during a peel-off test using cellophane tapes. However, when the primer coating was preliminarily made on the substrate, the formed films were kept intact without peeling-off even when pulled upward in the same test.

When the polyethylene terephthalate film carrying the die material containing silicon dioxide thin films was immersed in boiling water for 10 minutes, the dye material thin films on both sides or both colored layers were completely removed off from the no resin primer coated substrate, but kept intact on the polyethylene terephthalate film coated at both the sides with the resin primer layers. Hence, the formed thin films were proved having improved adhesion properties.

Example 14

In the same manner as Example 13, dyestuff containing silicon dioxide thin films (of about 150 nm thickness) were formed on a polyethylene terephthalate film of "OP-3", except that a processing solution was prepared by dissolving a mixture of 1.5 g of γ-aminopropyltriethoxysilane and 1 g of vinyl-tris (β-methoxyethoxy)silane into 250 ml of a mixture solvent medium comprising ethyl alcohol, isopropyl alcohol, and n-butyl alcohol at a (volume) ratio of 5:3:2 in this order. In this Example, dyestuffs shown in Table 14 were dissolved into ethanol at the room temperature to produce a 5% by weight liquid additive which was in turn added to the hydrosilicofluoric acid solution at a ratio of 1 cc to 100 cc. The coloring operation was carried out in each of the colorants listed in Table 14.

The types of the colorants and the test results are shown in Table 14, in which the thickness of each silicon dioxide film formed was measured by a contacting probe type film thickness measuring instrument.

TABLE 14

| Laser colorants | Film thickness ( Å ) | Color tone |
|---|---|---|
| RHODAMINE 6G | 1170 | Red |
| ACRDINE RED | 905 | Red |
| FLUORESCEIN | 4285 | Yellow |

It was acknowledged through the analysis with ESCA, SIMS, and IR that the pigments were uniformly incorporated with their respective thin films. As to RHODAMINE 6G, a fluorescent spectrum of around 600 nm was detected so that it was confirmed that it had a function of the colorant. In addition, each test substrate carrying the film of silicon dioxide was kept immersed in a solution of 99.5% ethanol for 24 hours, which resulted in no elusion of the organic dyestuff.

The silicon dioxide films containing colorants formed on the sides of the substrate which had been coated with no resin primer layers, were easily peeled off during the peel-off test using cellophane tapes. However, when the primer coating was preliminarily coated on the substrate, the formed films were kept intact providing a high degree of adhesion.

When the polyethylene terephthalate film carrying the silicon dioxide films containing the colorants were immersed in boiling water for 10 minutes, the silicon dioxide films containing the colorants on the sides which had been coated with no resin primer layers were completely removed off from the substrate. On the other hand, the silicon dioxide film formed on the side which had been coated with resin primer layers were kept intact. As a result, the formed films were proved having improved adhesion properties.

Example 15 same manner as Example 13, silicon dioxide films (of about 150 nm thickness) containing colorants were formed on a polyethylene terephthalate film of "TE#100(U02-)" (a product of Diawheel), in place of "OP-3", which is 100 μm in thickness (and has at one side a resin primer layer of 0.1 μm thickness).

The types of laser colorants and the test result are shown in Table 15, in which the thickness of each silicon dioxide film formed was measured by a contacting probe type film thickness measuring instrument.

TABLE 15

| Laser colorants | Film thickness (Å) | Color tone |
|---|---|---|
| RHODAMINE 110 | 5095 | Light orange |
| RHODAMINE 116 | 5275 | Orange |
| RHODAMINE B | 3660 | Red purple |
| RHODAMINE 123 | 8515 | Yellow |
| RHODAMINE 19 | 5005 | Red |
| RHODAMINE 6G | 3595 | Red |
| SULFORHODAMINE B | 1585 | Red purple |
| ACRDINE RED | 3868 | Red |
| FLUORESCEIN | 4218 | Yellow |
| COUMARIN 6 | 4800 | Dark orange |

It was acknowledged through the analysis with ESCA, SIMS, and IR that the laser colorants were uniformly incorporated with their respective films. When excitation light for each colorants was radiated to each film containing colorants, fluorescence was detected, so that it was confirmed that it had a function of the laser colorants. In addition, each test substrate carrying the film of silicon dioxide was kept immersed in a solution of 99.5% ehanol for 24 hours, which resulted in no elusion of the organic dyestuffs. The silicon dioxide films containing colorants formed on the sides of substrate which had been coated with primer layers has such strong adhesive strength that no peeling occurs during the peel-off test using cellophane tapes. Also, after immersion in boiling water for 10 minutes, the silicon dioxide films containing colorants were kept intact. As a result, the formed films were proved having improved adhesion properties. On the other hand, the silicon dioxide films containing colorants formed on the side of the substrate which had not been coated with primer layers was poor in bonding and adhesion.

Example 16

A biaxially oriented film of polypropylene measuring 100 mm long, 100 mm wide and 25 μm thick, and corona treatment on both sides, was immersed into a solution of Unistol P (a product of MITUSI PETROCHEMICAL INDUSTRIES LTD.) twice diluted with toluene, pull up at 30 cm/min, and dried out at 90° C. in a hot air oven for 30 minutes in order to form resin primer layers (of 2.0 μm thickness) on both the sides.

The biaxially oriented polypropylene films coated with the resin primer layers was immersed into a processing solution prepared by dissolving a mixture of 1.5 g of γ-aminopropyltriethoxysilane and 1.5 g of vinyl-tris(β-methoxyethoxy)silane into 250 ml of a mixture solvent medium comprising ethyl alcohol, isopropyl alcohol, and n-butyl alcohol at a (volume) ratio of 5:3:2 in this order, pull up at 15 cm/min and then dryout at 90° C. in a hot air oven for 30 minutes in order to form the first coating films thereon.

In the same manner as of Example 13, additive solution of 5% by weight prepared by dispersing disperse dyestuff of DIACELLITON FAST RED (a product of MITSUBISHI CHEMICAL INDUSTRIES LTD.) into distilled water, is added at the rate of 1 cc per 100 cc of hydrosilicofluoric acid solution supersaturated with silicon dioxide, and then silicon dioxide film is formed on the biaxially oriented polypropylene film.

The silicon dioxide films formed was in red color and their thickness was 2200 Å measured by a contacting probe type film thickness measuring instrument.

It was acknowledged through the analysis with ESCA, SIMS, and IR that the disperse dyestuff was uniformly incorporated with the formed thin films. In addition, each test substrate carrying the films of silicon dioxide was kept immersed in a solution of 99.5% ethanol for 24 hours, which resulted in no elution of the disperse dyestuff. Also, no peeling-off of the silicon dioxide film from the biaxially oriented polypropylene film was detected during an adhesive tape test and a sponge rubbing test.

As described above, the method of manufacturing an organic molded substrate coated with silicon dioxide film containing organic colorant of the first embodiment of the present invention, comprises the steps of: forming a first coating film composed of organic silicon compound, desirably, forming an organic resin primer layer having good adhesion ability to the surface of the organic substrate in advance and then, forming a first organic silicon compound film; and forming silicon dioxide film containing an organic colorant; wherein the silicon dioxide film having good adhesive ability for the thin organic resin primer layer is formed as the primary layer, and then the silicon dioxide film, containing organic colorant, having good adhesive ability for the primary layer is formed thereon as secondary layer. As a result, the first embodiment of the present invention has the following advantages:

1. The silicon dioxide film can be provided ensuring improved durability and having high adhesive properties and bond strength, as compared with that formed directly on the surface of a plastic molded substrate by a vapor deposition method or sputtering method.

2. Since the organic silicon compound film which is less flexible in "bending" and "folding" is formed very thin, the silicon dioxide film containing an organic colorant can be provided without lowering the flexibility with an organic film or a fiber even if it applied thereto.

3. The silicon dioxide films containing organic colorant can simultaneously be provided on both the sides, the circumferential surface, or the entire periphery of the organic molded substrate and also the obtained silicon dioxide film containing organic colorant has an ability for interrupting the passing of aqueous vapor, oxygen, or the like, so that not only oxidation and hydrolysis of the organic colorant is avoided but also the colorant dissolving into the water from the coloring layer causing lowering the coloring is prevented.

4. The obtained silicon dioxide film containing organic colorant has an ability to prevent organic solvent from passing therethrough, so that it can improve in resistance to solvents and chemicals of the coloring layer.

5. The silicon dioxide film containing organic colorant is formed at about the room temperature without heating at a high temperature, so that the method can be employed for application to thermally unstable organic colorants.

6. The silicon dioxide film, containing organic colorant, having slight impurities can be obtained.

7. The raw materials are low in price, so that the cost of manufacturing can be reduced.

8. The silicon dioxide film containing organic colorant can be formed on any substrate of complex configuration.

EXAMPLE OF THE SECOND EMBODIMENT

The second embodiment of the present invention will now be described in detail. It would also be understood that the second embodiment of the present invention is not limited to the example without departing the scope thereof.

Example 21

An acrylic resin plate (an extruded plate of 57000 in number-average molecular weight) measuring 100 mm long, 100 mm wide, and 1.5 mm thick was immersed in a solution (containing about 0.9% by weight of silicon compound) prepared by dissolving a mixture (D/C=0.22) of 1.5 g of γ-methacryloxypropyltrimethoxysilane and 3 g of CSGL-0803P (a hydrolysis of tetraethylorthosilicate available from CHISSO CORPORATION, having a solid substance of 8% in concentration) into 250 ml of a mixture solvent medium comprising ethanol, isopropyl alcohol, and n-butyl alcohol in a (volume) ratio of 5:3:2 in this order. The acrylic resin plate was then pulled up at a speed of 15 cm/min and dried out at the room temperature for an hour. In the same process, a primary thin film was formed on a glass substrate and its thickness was about 10 nm.

The acrylic resin plate coated with primary films was processed with the apparatus of forming silicon dioxide thin film, shown in FIG. 2, for forming thereon coloring layers of silicon dioxide film containing organic colorants shown in Table 21.

TABLE 21

| Additive dyestuffs | Film thickness (Å) | Color tone |
|---|---|---|
| KAYACYL YELLOW GG | 5350 | Light yellow |
| GREEN | 6200 | Green |
| ALIZARINE ASTROL | 8000 | Light purple |
| RHODAMINE 6G | 1200 | Red |
| ACRDINE RED | 900 | Red |
| FLUORESCEIN | 4300 | Yellow |
| RHODAMINE 19 | 5500 | Red |
| SULFORHODAMINE B | 1220 | Red purple |

As shown in FIG. 2, an immersing tank comprises an outer tank 1 and an inner tank 2, being filled with water 3 between the outer and inner tanks 1 and 2. The water 3 is kept heated to 40° C. by a heater 4 and stirred for uniform thermal dispersion. The inner tank 2 comprises a front section 6, an intermediate section 7, and a rear section 8, each section being filled with 6.5 liters of 2.5 mol/l hydrosilicofluoric acid solution prepared by dissolving and saturating silicon dioxide fed by industrial silica-gel powder. In addition, in the solution a solution having 5% by weight of a dyestuffs listed in Table 21 is added at the rate of 1 cc per 100 cc of hydrosilicofluoric acid solution. In practice, the coloring was carried out in each dyestuffs associated with its processing solution which was replaced with new one in each cycle of the operation.

The coloring operation was commenced with a circulation pump 10 actuated for circulating the water solution from the rear section 8 of the inner tank 2 through filter 11 back to the front section 6.

A plate of aluminium 12 measuring 50 mm long, 50 mm wide, and 3 mm thick was immersed into the solution of the rear section 8 and maintained for 10 hours. Then, the solution was turned to a proper processing solution containing a desired supersaturating rate of $SiO_2$. The filter 11 was adjusted to 1.5 μm in absolute filtering rate and the circulating flow of the processing solution was set to 520 ml/min (namely, about 8%/min since the total volume of the processing solution was about 6.5 liters). The acrylic resin plate 21 coated with the silicon compound primary layers was immersed vertically into the solution of the intermediate tank 7 and maintained for 16 hours under the foregoing condition (namely, the solution was circulated at about 8%/min through the 1.5 μm filter 11 with three of the aluminium plates remaining immersed) before removed out for cleaning and dryout.

The list of employed dyestuffs and the test result are shown in Table 21, in which the thickness of each silicon dioxide film formed was measured by a contacting probe type film thickness measuring instrument.

It was acknowledged through the analysis with Electron Spectroscopy for Chemical Analysis (ESCA), Secondary Ion Mass Spectrometry (SIMS), and Infrared Spectrophotometry (IR) that the organic dyestuffs were uniformly incorporated with their respective thin films. In addition, each test substrate carrying the silicon dioxide film was kept immersed in a solution of 99.5% ethanol for 24 hours, which resulted in no elution of the organic dyestuffs.

The silicon dioxide films containing organic colorant formed were kept intact without peeling-off during a peel-off test using adhesive cellophane tapes, demonstrating a high degree of adhesion. Also, after the acrylic resin plate coated with silicon dioxide films containing organic colorant were immersed in boiling water for an hour, no change in the adhesion of the films was detected.

As described above, the method of forming an acrylic resin molded substrate coated with silicon dioxide films containing organic colorant of the second embodiment of the present invention, in which on the surface of the acrylic resin molded substrate, a very thin film, containing silicon, having good adhesive ability is formed as a primary layer by coating and curing mixture containing silicon compound having methacryloxy group represented by the general formula (VI) and hydrolysis of silicon compound represented by the general formula (VII) at a specific rate, and then a silicon dioxide film containing organic colorant, which has good adhesive ability to the primary layer, is formed thereon. Accordingly, the second embodiment of the present invention provides the following advantages:

1. The silicon dioxide films containing organic colorant can simultaneously be provided on both the sides, the circumferential surface, or the entire periphery of the acrylic resin molded substrate and also the obtained silicon dioxide films containing organic colorant has an ability for interrupting the passing of aqueous vapor, oxygen, or the like, so that not only oxydation and hydrolysis of the organic colorant is avoided, but also the colorant dissolving into the water from the coloring layer causing lowering the coloring is prevented.

2. The obtained silicon dioxide film containing organic colorant can have an ability to prevent organic solvents and chemicals from passing therethrough and thus, so that it can improve in resistance to solvents and chemicals of the coloring layer.

3. Since organic colorant is protected with silicon dioxide in structure, the coloring layer can be provided ensuring high endurance and resistance to wear and climate.

4. The silicon dioxide film containing organic colorant is formed at about the room temperature without heat-up at a high temperature, so that the method can be employed for application to thermally unstable organic colorants.

5. In the process for forming the primary layer, dilute solution of silicon compound can be employed as coating solution for use, and the silicon compound diffuses into the acrylic resin, so that thin film following the configuration can be formed on the acrylic resin substrate even having fine concaves and convexes without deffect.

EXAMPLES OF THE THIRD EMBODIMENT

The third embodiment of the present invention will be described in detail. It would also be understood that the third embodiment of the present invention is not limited to the these examples without departing the scope thereof.

Example 31

A polycarbonate plate measuring 100 mm long, 100 mm wide, and 1 mm thick was immersed in a solution (containing about 0.9% by weight of silicon compound) prepared by dissolving a mixture of 0.5 g of N-(β-aminoethyl)-γ-aminopropyltrimethoxysilane and 1.2 g of vinyl-tris(β-methoxyethoxy)silane into 250 ml of a mixture solvent medium comprising ethanol, isopropyl alcohol, and n-butyl alcohol in a (volume) ratio of 5:3:2 in this order. The polycarbonate plate was then pulled up at a speed of 15 cm/min and dried out at 100° C. in a hot air oven for an hour. In the same process, a primary film layer was formed on a glass substrate and its thickness was about 10 nm.

The polycarbonate (PC) plate coated with organic silicon compound film layers was processed with the apparatus of forming silicon dioxide film, shown in FIG. 2, for forming thereon color layers of silicon dioxide film containing organic colorants shown in Table 31.

As shown in FIG. 2, an immersing tank comprises an outer tank 1 and an inner tank 2, being filled with water 3 between the outer and inner tanks 1 and 2. The water 3 is kept heated to 40° C. by a heater 4 and stirred for uniform thermal dispersion. The inner tank 2 comprises a front section 6, an intermediate section 7, and a rear section 8, each section being filled with 6.5 liters of 2.5 mol/l hydrosilicofluoric acid solution prepared by dissolving and saturating silicon dioxide fed by industrial silica-gel powder. In addition, in the solution a solution having 0.5% by weight of a dyestuffs listed in Table 31 is added at the rate of 1 cc per 100 cc of hydrosilicofluoric acid solution. In practice, the coloring was carried out in each dyestuffs associated with its processing solution which was replaced with new one in each cycle of the operation.

The coloring operation was commenced with a circulation pump 10 actuated for circulating the water solution from the rear section 8 of the inner tank 2 through a filter 11 back to the front section 6.

A plate of aluminium 12 measuring 50 mm long, 50 mm wide, and 3 mm thick was immersed into the solution of the rear section 8 and maintained for 10 hours. Then, the solution was turned to a proper processing solution containing a desired supersaturating rate of $SiO_2$. The filter 11 was adjusted to 1.5 μm in absolute filtering rate and the circulating flow of the processing solution was set to 520 ml/min (namely, 8%/min since the total volume of the processing solution was about 6.5 liters). The polycarbonate plate 31 coated with the silicon compound first film layers was immersed vertically into the solution of the intermediate tank 7 and maintained for 16 hours under the foregoing condition (namely, the solution was circulated at about 8%/min through the 1.5 μm filter 11 with three of the aluminium plates remaining immersed) before removed out for cleaning and dryout.

The list of employed dyestuffs and the test result are shown in Table 31, in which the thickness of each silicon dioxide film developed was measured by a contacting probe type film thickness measuring instrument.

TABLE 31

| Additive dyestuffs | Film thickness (Å) | Color tone |
|---|---|---|
| KAYACYL YELLOW GG | 5200 | Light yellow |
| MALACHITE GREEN | 6000 | Green |
| ALIZARINE ASTROL | 7800 | Light purple |
| RHODAMINE 6G | 1200 | Red |
| ACRDINE RED | 900 | Red |
| FLUORESCEIN | 4000 | Yellow |
| RHODAMINE 19 | 5000 | Red |
| SULFORHODAMINE B | 1220 | Red purple |

It was acknowledged through the analysis with Electron Spectroscopy for Chemical Analysis (ESCA), Secondary Ion Mass Spectrometry (SIMS), and Infrared Spectrophotometry (IR) that the organic dyestuffs were uniformly incorporated with their respective thin films. In addition, each test substrate carrying the film of silicon dioxide was kept immersed in a solution of 99.5% ethanol for 24 hours, which resulted in no elution of the organic dyestuffs.

The silicon dioxide films containing organic colorant were kept intact without peeling-off during a peel-off test using adhesive cellophane tapes, demonstrating a high degree of adhesion. Also, after the polycarbonate plate coated with the dioxide thin films containing organic colorant was immersed in boiling water for an hour, the films remained unchanged ensuring effectiveness in the adhesion.

As described above, the method of forming a polycarbonate structure coated with silicon dioxide films containing organic colorant of the third embodiment of the present invention, in which on the surface of polycarbonate molded substrate, a very thin film, containing silicon, having good adhesive ability is formed as a primary layer by coating and curing mixture containing silicon compound having amino group, and silicon compound represented by the general formula (VIII) or hydrolysis thereof at a specific rate, and then a silicon dioxide film containing organic colorant, which has good adhesive ability to the primary layer, is formed thereon. Accordingly, the third embodiment of the present invention provides the following advantages:

1. The silicon dioxide thin films containing organic colorant can simultaneously be provided on the front and back sides, the circumferential surface, or the entire periphery of the polycarbonate molded substrate and also the obtained silicon dioxide films containing organic colorants has an ability for interrupting the passing of aqueous vapour, oxygen, or the like, so that not only oxydation and hydrolysis of the organic coloring agent is avoided, but also from the coloring layer causing lowering the coloring is prevented.

2. The silicon dioxide film containing organic colorant can have an ability to prevent an organic solvent and chemicals from passing therethrough and thus, so that it can improve in resistance to solvents and chemicals of the coloring layer.

3. Since the organic colorant is protected with silicon dioxide in structure, the coloring layer can be provided ensuring high endurance and resistance to wear and climate.

4. The silicon dioxide film containing organic colorant is formed at about the room temperature without heat-up at a high temperature, the method can be employed for application to thermally unstable organic colorants.

5. In the process for forming the primary layer, dilute solution of silicon compound can be employed as coating solution for use, and the silicon compound diffuses into the polycarbonate, so that thin film following the configuration can be formed on the polycarbonate substrate even having fine concaves and convexes without deffect.

EXAMPLES OF THE FOURTH EMBODIMENT

The fourth embodiment of the present invention will now be described in detail referring to the examples.

Example 41

Using the foregoing apparatus of FIG. 2, films of silicon dioxide containing organic colorant listed in Table 41 were produced on the surfaces of $TiO_2$ particles. Accordingly, colored particles of $TiO_2$ were obtained.

In practice, the water 3 contained in the outer tank 1 was kept at 35° C. by the heater 4.

The inner tank 2 of 500 cc capacity which was installed inside of the outer tank 1, was filled with a processing solution prepared by adding 15 cc of 0.5 mol/l boric acid water solution to 250 cc of 2.5 mol/l hydrosilicofluoric acid solution saturated with silica gel which was kept at 34° C. Each of the dyestuffs listed in Table 41 was dissolved at the room temperature into water to produce a 5% by weight or saturated additive solution which was in turn added to the processing solution at the rate of 1 cc per 100 cc of hydrosilicofluoric acid solution. The coloring operation with each dyestuffs of Table 41 was carried out.

For the coloring operation, 10 g of $TiO_2$ particles which is about 1 micron in average diameter, was added to the processing solution. After stirring for 20 hours, silicon dioxide films containing dyestuffs were formed on the surfaces of the $TiO_2$ particles. For evaluation of the silicon dioxide films containing dyestuffs for thickness and quality, a glass plate of 1.1 mm (thickness) x 20 mm × 50 mm was simultaneously immersed in the processing solution to form a color layer thereon.

The list of employed dyestuffs and the test result are shown in Table 41, in which the thickness of each silicon dioxide film formed was measured by a contacting probe type film thickness measuring instrument.

TABLE 41

| Additive dyestuffs | Film thickness (Å)* | Color tone |
|---|---|---|
| KAYACYL YELLOW GG | 2100 | Light yellow |
| RED 21P | 2700 | Light yellow |
| KAYACYL RHODAMINE FB | 1400 | Light red |
| RED 3P | 2500 | Light red |
| VICTORIA BLUE BH | 3400 | Blue green |
| VICTORIA PURE BLUE BOH | 1800 | Light yellow green |
| MALACHITE GREEN | 2100 | Light green |
| GREEN 10P | 1600 | Light yellow green |
| METHYL VIOLET PURE | 7750 | Light blue |
| ALIZARINE ASTROL | 8100 | Light purple |

*Film thicknesses are for the films formed on the glass substrates.

It was acknowledged through the analysis with Electron Spectroscopy for Chemical Analysis (ESCA), Secondary Ion Mass Spectrometry (SIMS), and Infrared Spectrophotometry (IR) that the organic colorants were uniformly incorporated with their respective thin films. In addition, the $TiO_2$ particles coated with the silicon dioxide films were kept immersed in a solution of 99.5% ethanol for 24 hours, which resulted in no elusion of the organic dyestuff.

Example 42

Using the foregoing apparatus of FIG. 2, films of silicon dioxide containing laser colorants listed in Table 42 were formed on the surfaces of glass flakes. Accordingly, colored glass flakes were obtained. In this case, the processing solution was prepared by saturating hydrosilicofluoric acid solution of $-3°$ C. with silica gel for about 2 hours and then by adding each of laser colorants listed in Table 42 to the solution at the rate 1 cc per 100 cc of the solution. The processing solution was transferred to the inner tank shown in FIG. 2 and the water in the outer tank was heated up to 50° C. In the same manner as Example 41, glass plates for evaluation standard as well as 10 g of glass flakes were immersed into the solution transferred.

After stirring for 20 hours, the coloring was completed with a result shown in Table 42. The colored glass flakes were kept immersed in a solution of 99.5% ethanol for 24 hours, which resulted in no elution of the laser colorants.

TABLE 42

| Laser colorants | Film thickness (Å)* | Color tone |
|---|---|---|
| RHODAMINE 110 | 2000 | Light orange |
| RHODAMINE 116 | 2300 | Light orange |
| RHODAMINE B | 1400 | Light red purple |
| RHODAMINE 123 | 3100 | Yellow |
| RHODAMINE 19 | 1600 | Light red |
| RHODAMINE 6G | 1700 | Light red |
| FLUORESCEIN | 1700 | Light yellow |
| COUMARINE 6 | 1900 | Orange |

*Film thickness are for the films formed on the glass substrate.

EXAMPLE OF FIFTH EMBODIMENT

The fifth embodiment of the present invention will now be described in detail referring to the examples.

Example 51

A glass plate measuring 1.1 mm thick, 25 mm wide, and 50 mm long which had been cleaned by an ultrasonic-wave cleaner and dried out, was provided with a masking of 200-micron-wide stripes arranged thereon at intervals of 100 microns (for parts without mask) by a photo-resist method. As accompanied with a glass plate of the same kind without masking, the glass plate with the masking was immersed into the solution prepared by adding an organic dyestuff commercially known as DIACELLITON FAST RED R to hydrosilicofluoric acid solution saturated with silicon dioxide for producing red-color layers. The coloring was carried out using the apparatus of FIG. 2.

In this case, the water filled in the outer tank 1 of 2 l capacity was kept at 35° C. by the heater 4.

The 500 cc capacity inner tank 4 installed in the outer tank 1 was filled with a processing solution prepared by adding 15 cc of 0.5 mol/l boric acid water solution to 250 cc of 2.5 mol/l hydrosilicofluoric acid solution containing silica gel in saturation which was kept at 34° C.

In order to color the processing solution, 5% by weight additive prepared by dispersing DIACELLITON FAST RED R into water at the room temperature, is added to the processing solution at a rate of 1 cc per 100 cc of hydrosilicofluoric acid solution, and thereafter coloring operation is carried out.

Then, the obtained colored glass plate with no masking was examined in film thickness, distribution of dyestuff throughout film, film resistance to solvent, and optical spectrum characteristics. The total film thickness (namely, both sides) of 2.5 microns was measured using a contacting probe type film thickness measuring instrument. It was also acknowledged through the analysis with Electron Spectroscopy for Chemical Analysis (ESCA), Secondary Ion Mass Spectrometry (SIMS), and Infrared Spectrophotometry (IR) that the dyestuff was uniformly incorporated with the film.

Figure 3:
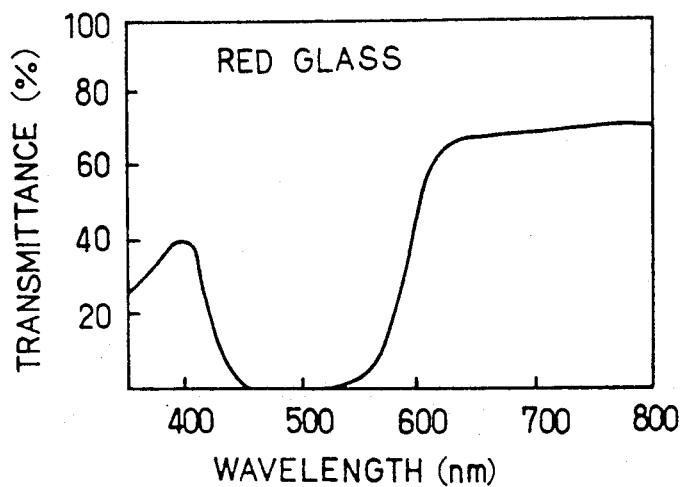
FIGS. 3 to 5 respectively designate transmission spectra of red glass, green glass, and blue glass.

The colored glass plate coated with silicon dioxide films were also immersed in a solution of 99.9% alcohol for 24 hours, which results in no elusion of the dyestuff. Its optical spectrum for the glass without mask is shown in FIG. 3.

On the other hand, the glass plate with 200-micron-wide striped masking was cleaned for removal of masking agents using organic solvent. After dried out, the glass plate was prepared for coloring in green and provided with 200-micron-wide masking stripes arranged thereon by a photo resist method so as to lap over the 100-micron-wide red color stripes and simultaneously, leave 100-micron-wide stripes of no masking region.

Figure 4:
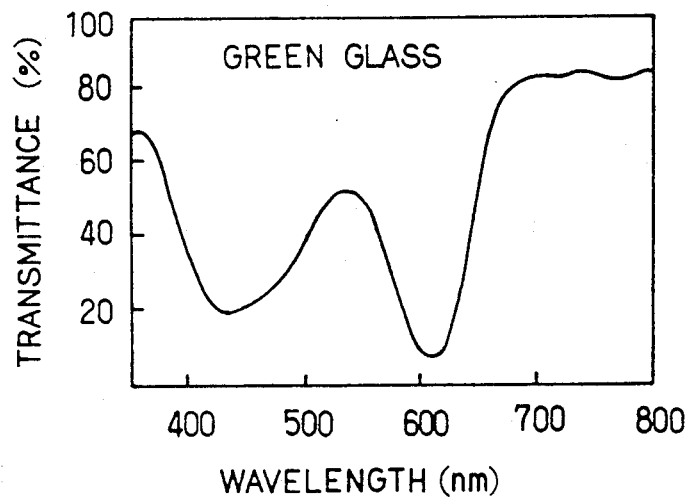

Then, the masked glass plate was immersed, as accompanied with the no-masking glass plate, into the solution containing an organic dyestuff of MALACHITE GREEN for coloring in green in the same manner as those of coloring in red. The colored glass plates were examined in the same manner as of red color coloring. The (total) thickness of the films formed on both sides was 3.4 microns while no defect was detected in the distribution of dyestuff throughout the film and the resistance to alcohol like red coloring. The spectrum of the green color glass plate is shown in FIG. 4.

The masked glass plate after cleaned down for removal of masking agents, was processed for coloring in blue of the uncolored region of 100-micron-wide (stripes) with the rest of the surface being masked, using a blue dyestuff of BLUE 5P.

In a similar manner for coloring in red and green, the no masked glass plate was also processed for comparison.

Figure 5:
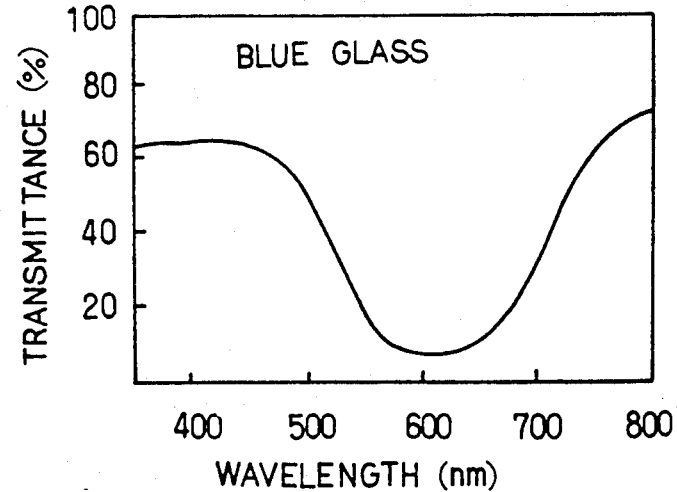

The optical spectrum of the blue color glass plate is shown in FIG. 5, in which the thickness of the films formed on both sides is 3.0 microns total. Similar to coloring in red and green, no defect was detected in the resistance to alcohol.

After the masking agents coated over the red and green color region were removed from the surface which was then cleaned and dried out, the 100-micron-wide stripes of red, green, and blue were formed on the glass plate representing an arrangement of striped RGB matrix as viewed through an optical microscope.

EXAMPLES OF THE SIXTH EMBODIMENT

The sixth embodiment of the present invention will now be described in detail referring to the examples.

Example 61

Using the foregoing apparatus of FIG. 2, silicon dioxide films containing organic dyestuff listed in Table 61 were developed on the surface of a glass plate measuring 1.1 mm thick, 25 mm wide, and 50 mm long. In practice, the water 3 contained in the outer tank 1 of 2 liter capacity was kept at 35° C. by the heater 4.

The inner tank 2 of 500 cc capacity which was installed within the outer tank 1, was filled with a processing solution prepared by adding 15 cc of 0.5 mol/l boric acid water solution to 250 cc of 2.5 mol/l hydrosilicofluoric acid solution saturated with silica gel which was kept at 34° C. Each of the dyestuff listed in Table 61 was dissolved at the room temperature into water to produce 5% by weight or saturated additive solution which was in turn added to the processing solution at the rate of 1 cc per 100 cc of hydrosilicofluoric acid solution. The coloring operation with each dyestuff of Table 61 was carried out.

TABLE 61

| Additive dyestuffs | Film thickness (Å) | Color tone |
|---|---|---|
| KAYACYL YELLOW GG | 4800 | Light yellow |
| RED 21P | 6800 | Light yellow |
| KAYACYL RHODAMINE FB | 4200 | Red |
| RED 3P | 7200 | Light red |
| VICTORIA BLUE BH | 8100 | Blue green |
| VICTORIA PURE BLUE BOH | 4700 | Yellow green |
| MALACHITE GREEN | 4600 | Green |
| GREEN 10P | 2900 | Yellow green |

It was acknowledged through the analysis with Electron Spectroscopy for Chemical Analysis (ESCA), Secondary Ion Mass Spectrometry (SIMS), and Infrared Ray Spectrometry (IR) that the organic colorants listed in Table 61 were uniformly incorporated with their respective thin films. In addition, the colored glass plate carrying silicon dioxide films was kept immersed in solution of 99.5% ethanol for 24 hours, which resulted in no elution of the organic dyestuff.

Figure 6:
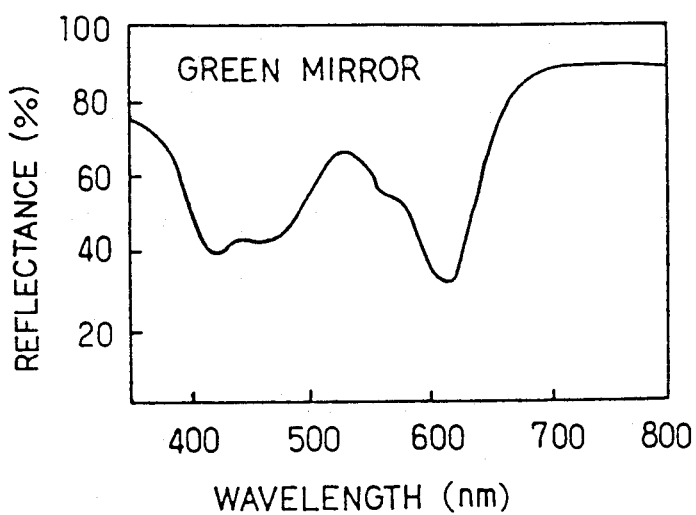
FIGS. 6 to 8 respectively designate reflection spectra from colored mirrors.

Among the glass coated with silicon dioxide containing organic colorants, the glass coated with MALACHITE GREEN is formed Al film on one side by the vacuum deposition method to produce colored mirror. The reflection spectra are shown in FIG. 6.

Example 62

Using the foregoing apparatus of FIG. 2, films of silicon dioxide containing laser colorant listed in Table 62 were formed on the surface of a glass plate measuring 1.1 mm thick, 25 mm wide, and 50 mm long. In this case, the processing solution was prepared by saturating hydrosilicofluoric acid solution of $-3°$ C. with silica gel for about 2 hours and then, by adding each of the laser colorants listed in Table 62 at the rate 1 cc per 100 cc of the solution. The processing solution was transferred to the inner tank shown in FIG. 2 and the water in the outer tank was heated up to 50° C. Then, the glass plate was immersed into the processing solution transferred.

After coloring for 16 hours, it resulted as shown in Table 62. The colored glass plate was then immersed in a solution of 99.9% ethanol for 24 hours, which resulted in no elution of the organic dyestuffs.

TABLE 62

| Laser colorants | Film thickness (Å) | Color tone |
|---|---|---|
| METHYL VIOLET PURE SP | 7700 | Light blue |
| BLUE 5P | 2000 | Blue |
| ALIZARINE ASTROL | 9300 | Light purple |
| DIACELLITON FAST RED R | 7500 | Red |

Figure 7:
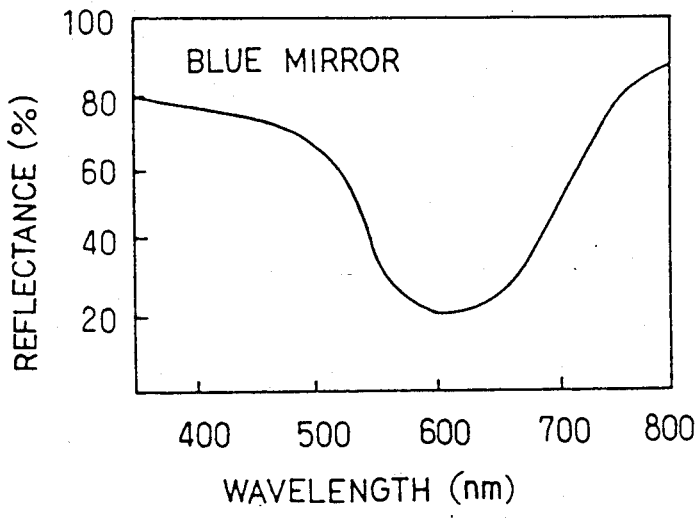
Figure 8:
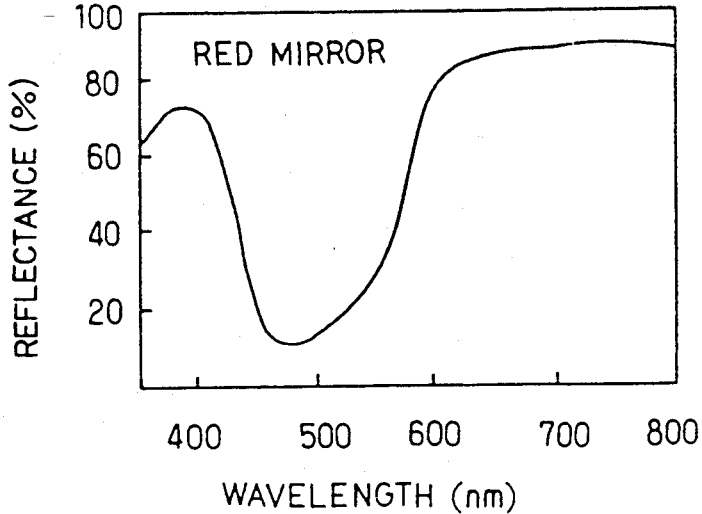

Among the glass coated with silicon dioxide containing organic colorants, the glasses coated with BLUE 5P and DIACELLITON FAST RED R are formed Al film on one side by vacuum deposition method to produce colored mirrors. The reflection spectra are shown in FIGS. 7 and 8.

It is understandable from the examples that the sixth embodiment of the present invention provides a highly durable color mirror.

EXAMPLES OF THE SEVENTH EMBODIMENT

The seventh embodiment of the present invention will be described in detail. It would also be understood that the present invention is not limited to the examples without departing the scope thereof.

Example 71

A plate of slide glass measuring 75 mm long, 25 mm wide, and 1 mm thick was used as a test substrate which had been cleaned and dried completely.

Various kinds of laser colorants were dissolved in distilled water at the room temperature to produce an amount of 5% by weight or saturated liquid additive.

Also, processing solution was prepared by either adding 8 cc of 0.5 mol/L boric acid water solution to 100 cc of hydrosilicofluoric acid solution saturated with silica gel or dissolving 0.4 g of metallic aluminium into the same hydrosilicofluoric acid solution. 100 cc of the processing solution was mixed with 1 cc of each laser colorant additive liquid in a beaker which was in turn heated in a water bath at 35° C. after stirring. Then, the test substrates were immersed in respective processing solutions and 16 hours later, removed out for cleaning and dryout.

The list of additive laser colorant and the test result are shown in Table 71, in which the thickness of each silicon dioxide film formed on the slide glass was measured by a contacting prove type film thickness measuring instrument.

TABLE 71

| Laser colorants | Film thickness (Å) | Color tone |
|---|---|---|
| RHODAMINE 110 | 4400 | Light orange |
| RHODAMINE 116 | 4700 | Orange |
| RHODAMINE B | 2900 | Red purple |
| RHODAMINE 123 | 7800 | Yellow |
| RHODAMINE 19 | 4600 | Red |
| RHODAMINE 6G | 3000 | Red |
| SULFORHODAMINE B | 2200 | Red purple |
| ACRDINE RED | 3400 | Red |

TABLE 71-continued

| Laser colorants | Film thickness (Å) | Color tone |
|---|---|---|
| FLUORESCEIN | 4100 | Yellow |

It was acknowledged through analysis with Electron Spectroscopy for Chemical Analysis (ESCA), Secondary Ion Mass Spectrometry (SIMS), and Infrared Spectrophotometry (IR) that the laser colorants were uniformly incorporated with their respective thin films. In addition, each test substrate carrying the film of silicon dioxide was kept immersed in a solution of 99.5% ethanol for 24 hours, which resulted in no elution of the colorants.

Also, no peeling-off of the silicon dioxide film from the substrate was detected during a tape test and a sponge rubbing test.

Example 72

A plate of slide glass measuring 75 mm long, 25 mm wide, and 1 mm thick was used as a test substrate which had been cleaned and dried completely.

Various kinds of dyestuffs were dissolved in distilled water at the room temperature to produce an amount of 5% by weight or saturated liquid additive.

Also, processing solution was prepared by either adding 8 cc of 0.5 mol/L boric acid water solution to 100 cc of hydrosilicofluoric acid solution saturated with silica gel or dissolving 0.4 g of metallic aluminium into the same hydrosilicofluoric acid solution. 100 cc of the processing solution was mixed with 1 cc of each dyestuffs additive liquid in a beaker which was in turn heated in a water bath at 35° C. after stirring. Then, the test substrates were immersed in respective processing solutions and 16 hours later, removed out for cleaning and dryout.

The list of additive dyestuffs and the test result are shown in Table 72, in which the thickness of each silicon dioxide film formed on the slide glass was measured by a contacting probe type film thickness measuring instrument.

TABLE 72

| Additive dyestuffs | Film thickness (Å) | Color tone |
|---|---|---|
| KAYACYL YELLOW GG | 6400 | Light yellow |
| MALACHITE GREEN | 5800 | Green |
| ALIZARINE ASTROL | 7300 | Light purple |

It was acknowledged through analysis with ESCA, SIMS, and IR that the dyestuffs were uniformly incorporated with their respective thin films.

In addition, each test substrate carrying the film of silicon dioxide was kept immersed in a solution of 99.5% ethanol for 24 hours, which resulted in no elution of the pigment. Also, no peeling-off of the silicon dioxide film from the substrate was detected during a tape test and a sponge rubbing test.

Example 73

A plate of slide glass measuring 75 mm long, 25 mm wide, and 1 mm thick was used as a test substrate which had been cleaned and dried completely.

A disperse dyestuffs known as DIACELLITON FAST RED R (a product of MITSUBISHI CHEMICAL INDUSTRIES LTD.) was dispersed into distilled water at the room temperature for producing an amount of 5% by weight liquid additive.

Processing solution was prepared by dissolving 0.4 g of dissolved metallic aluminium into 100 cc of hydrosilicofluoric acid solution saturated with silica gel. 1 cc of the disperse dyestuff solution was mixed with the processing solutions in a beaker which was in turn heated in a water bath at 35° C. after stirring. Then, the test substrate was immersed in the processing solution and 16 hours later, removed out for cleaning and dryout.

The formed silicon dioxide film appeared in red and its thickness was 7300 Å measured by a contacting probe type film thickness measuring instrument.

It was acknowledged through analysis with ESCA, SIMS, and IR that the disperse dyestuff was uniformly incorporated with the thin film. In addition, the test substrate carrying the film of silicon dioxide was kept immersed in a solution of 99.5% ethanol for 24 hours, which resulted in no elution of the disperse dyestuff.

Also, no peeling-off of the silicon dioxide film from the substrate was detected during a tape test and a sponge rubbing test.

EXAMPLES OF THE EIGHTH EMBODIMENT

The eighth embodiment of the present invention will be described in detail. It would also be understood that the present invention is not limited to the examples without departing the scope thereof.

Example 81

A stainless steel plate coated with a $SiO_2$ film of 1000 Å thickness by the sol-gel method was employed as a test substrate which is 75 mm in length, 25 mm in width, and 1 mm thickness.

Various kind of laser colorant were dissolved in distilled water at the room temperature to produce an amount of 5% by weight or saturated liquid additive.

Also, processing solution wa prepared by either adding 8 cc of 0.5 mol/L boric acid water solution to 100 cc of hydrosilicofluoric acid solution saturated with silica gel or dissolving 0.4 g of metallic aluminium into the same hydrosilicofluoric acid solution. 100 cc of the processing solution was mixed with 1 cc of each laser colorant additive liquid in a beaker which was in turn heated in a water bath at 35° C. after stirring. Then, the test substrates were immersed in respective processing solutions and 16 hours later, removed out for cleaning and dryout.

The list of additive laser colorants and the test result are shown in Table 81, in which the thickness of each silicon dioxide film formed on the slide glass was measured by a contacting probe type film thickness measuring instrument.

TABLE 81

| Laser colorants | Film thickness (Å) | Color tone |
|---|---|---|
| RHODAMINE 110 | 4400 | Light orange |
| RHODAMINE 116 | 4700 | Orange |
| RHODAMINE B | 2900 | Red purple |
| RHODAMINE 123 | 7800 | Yellow |
| RHODAMINE 19 | 4600 | Red |
| RHODAMINE 6G | 3000 | Red |
| SULFORHODAMINE B | 2200 | Red purple |
| ACRDINE RED | 3400 | Red |
| FLUORESCEIN | 4100 | Yellow |

It was acknowledged through analysis with Electron Spectroscopy for Chemical Analysis (ESCA), Secondary Ion Mass Spectrometry (SIMS), and Infrared Spectrophotometry (IR) that the laser colorants were uniformly incorporated with their respective thin films. In addition, each test substrate carrying the silicon dioxide film was kept immersed in a solution of 99.5% ethanol for 24 hours, which resulted in no elution of the organic colorants.

Also, no peeling-off of the silicon dioxide film from the substrate was detected during a tape test and a sponge rubbing test.

Example 82

A plate of slide glass coated with an aluminium layer of 1000 Å thickness and a $SiO_2$ layer of 300 Å thickness by a sputtering method was used as a test substrate measuring 75 mm long, 25 mm wide, and 1 mm thick.

Various kind of dyestuffs were dissolved in distilled water at the room temperature to produce an amount of 5% by weihgt or saturated liquid additive.

Also, processing solution was prepared by either adding 8 cc of 0.5 mol/L boric acid water solution to 100 cc of hydrosilicofluoric acid solution saturated with silica gel or dissolving 0.4 g of metallic aluminium into the same. 100 cc of the processing solution was mixed with 1 cc of each dyestuff additive liquid in a beaker which was in turn heated in a water bath at 35° C. Then, the test substrates were immersed in respective processing solutions and 16 hours later, removed out for cleaning and dryout.

The list of additive dyestuffs and the test result are shown in Table 82, in which the thickness of each silicon dioxide film developed was measured by a contacting probe type film thickness measuring instrument.

TABLE 82

| Additive dyestuffs | Film thickness (Å) | Color tone |
|---|---|---|
| KAYACYL YELLOW GG | 6400 | Light yellow |
| MALACHITE GREEN | 5800 | Green |
| ALIZARINE ASTROL | 7300 | Light purple |

It was acknowledged through analysis with ESCA, SIMS, and IR that the dyestuffs were uniformly incorporated with their respective thin films.

In addition, each test substrate carrying the silicon dioxide film was kept immersed in a solution of 99.5% ethanol for 24 hours, which resulted in no elution of the dyestuffs. Also, no peeling-off of the silicon dioxide film from the substrate was detected during a tape test and a sponge rubbing test.

Example 83

A stainless plate measuring 75 mm long, 25 mm wide, and 1 mm thick and coated with a $TiO_2$ layer of 1000 Å thickness by a sol-gel method was used as a test substrate.

A disperse dyestuffs known as DIACELLITON FAST RED R (a product of MITSUBISHI CHEMICAL INDUSTRIES LTD.) was dispersed into distilled water at the room temperature for producing an amount of 5% by weight liquid additive.

Processing solution was prepared by dissolving 0.4 g of metallic aluminium into 100 cc of hydrosilicofluoric acid solution saturated with silica gel. 1 cc of the disperse dyestuff solution was mixed with the processing solution in a beaker which was in turn heated in a water bath at 35° C. after stirring. Then, the test substrate was immersed in the processing solution and 16 hours later, removed out for cleaning and dryout.

The formed silicon dioxide film appeared in red color and its thickness was 7300 Å measured by a contacting probe type film thickness measuring instrument.

It was acknowledged through analysis with ESCA, SIMS, and IR that the disperse dyestuff was uniformly incorporated with the thin film. In addition, the test substrate carrying the silicon dioxide film was kept immersed in a solution of 99.5% ethanol for 24 hours, which resulted in no elution of the disperse dyestuffs.

Also, no peeling-off of the silicon dioxide film from the substrate was detected during a tape test and a sponge rubbing test.

EXAMPLES OF THE NINTH EMBODIMENT

The ninth embodiment of the present invention will now be described in detail referring to the examples.

Example 91

A cover glass measuring 30 mm in diameter and 1 mm in thickness was used as a test substrate which had been cleaned and dried completely.

Various kind of laser colorants were dissolved in distilled water at the room temperature to produce an amount of 5% by weight or saturated liquid additive.

Also, processing solution was prepared by either adding 8 cc of 0.5 mol/L boric acid water solution to 100 cc of hydrosilicofluoric acid solution saturated with silica gel or dissolving 0.4 g of metallic aluminium into the same hydrosilicofluoric acid solution. 100 cc of the processing solution was mixed with 1 cc of each laser colorant additive liquid in a beaker which was in turn heated in a water bath at 35° C. after stirring. Then, the test substrates were immersed in respective processing solutions and 16 hours later, removed out for cleaning and dryout.

The list of additive laser pigments and the test result are shown in Table 91, in which the thickness of each silicon dioxide film formed on the slide glass was measured by a contacting probe type film thickness measuring instrument.

TABLE 91

| Laser colorants | Film thickness (Å) | Color tone |
|---|---|---|
| RHODAMINE 110 | 4700 | Light orange |
| RHODAMINE 116 | 5200 | Orange |
| RHODAMINE B | 3900 | Red purple |
| RHODAMINE 123 | 8600 | Yellow |
| RHODAMINE 19 | 4700 | Red |
| RHODAMINE 6G | 3400 | Red |
| SULFORHODAMINE B | 2000 | Red purple |
| ACRDINE RED | 3900 | Red |
| FLUORESCEIN | 4000 | Yellow |

It was acknowledged through analysis with Electron Spectroscopy for Chemical Analysis (ESCA), Secondary Ion Mass Spectrometry (SIMS), and Infrared Spectrophotometry (IR) that the laser colorants were uniformly incorporated with their respective thin films. In addition, each test substrate carrying the film of silicon dioxide was kept immersed in a solution of 99.5% ethanol for 24 hours, which resulted in no elution of the organic colorant.

Also, no peeling-off of the silicon dioxide film from the substrate was detected during a tape test and a sponge rubbing test.

Example 92

A cover glass measuring 30 mm in diameter and 1 mm in thickness was used as a test substrate which had been cleaned and dried completely.

Various kinds of dyestuffs were dissolved in distilled water at the room temperature to produce an amount of 5% by weight or saturated liquid additive.

Also, processing solution was prepared by either adding 8 cc of 0.5 mol/L boric acid water solution to 100 cc of hydrosilicofluoric acid solution saturated with silica gel or dissolving 0.4 g of metallic aluminium into the same hydrosilicofluoric acid solution. 100 cc of the processing solution was mixed with 1 cc of each dyestuff additive liquid in a beaker which was in turn heated in a water bath at 35° C. after stirring. Then, the test substrates were immersed in respective processing solutions and 16 hours later, removed out for cleaning and dryout.

The list of additive dyestuffs and the test result are shown in Table 92, in which the thickness of each silicon dioxide film formed on the slide glass was measured by a contacting probe type film thickness measuring instrument.

TABLE 92

| Additive dyestuffs | Film thickness (Å) | Color tone |
|---|---|---|
| KAYACYL YELLOW GG | 5100 | Light yellow |
| MALACHITE GREEN | 6100 | Green |
| ALIZARINE ASTROL | 7900 | Light purple |

It was acknowledged through analysis with ESCA, SIMS, and IR that the dyestuffs were uniformly incorporated with their respective thin films.

In addition, each test substrate carrying the silicon dioxide film was kept immersed in a solution of 99.5% ethanol for 24 hours, which resulted in no elution of the dyestuff. Also, no peeling-off of the silicon dioxide film from the substrate was detected during a tape test and a sponge rubbing test.

Example 93

A cover glass measuring 30 mm in diameter and 1 mm in thickness was used as a test substrate which had been cleaned and dried completely.

A disperse dyestuff known as DIACELLITON FAST RED R (a product of MITSUBISHI CHEMICAL INDUSTRIES LTD.) was dispersed into distilled water at the room temperature for producing an amount of 5% by weight liquid additive.

Processing solution was prepared by dissolving 0.4 g of metallic aluminium into 100 cc of hydrosilicofluoric acid solution saturated with silica gel. 1 cc of the disperse dyestuff liquid additive was mixed with the processing solution in a beaker which was in turn heated in a water bath at 35° C. after stirring. Then, the test substrate was immersed in the processing solution and 16 hours later, removed out for cleaning and dryout.

The formed silicon dioxide film appeared in red color and its thickness was 7500 Å measured by a contacting probe type film thickness measuring instrument.

It was acknowledged through analysis with ESCA, SIMS, and IR that the disperse dyestuff was uniformly incorporated with the thin film. In addition, the test substrate carrying the silicon dioxide film was kept immersed in a solution of 99.5% ethanol for 24 hours, which resulted in no elution of the disperse dyestuff. Also, no peeling-off of the silicon dioxide film from the substrate was detected during a tape test and a sponge rubbing test.

What is claimed is:

1. A method for forming a colored silicon dioxide film comprising the steps of:
    saturating an aqueous solution of hydrosilicofluoric acid with silicon dioxide;
    supersaturating the resulting saturated solution by adding an additive to the saturated solution or by heating the saturated solution;
    adding an organic colorant to the saturated or supersaturated solution; and
    immersing a substrate in the resulting supersaturated solution containing the organic colorant, thereby depositing a silicon dioxide film containing the organic colorant onto the substrate.

2. A method for coloring an organic substrate comprising the steps of:
    (i) forming on the organic substrate a primary film by coating and curing at least one kind of silicon compound selected from a group consisting of organic silicon compound represented by general formula (I):

$$R^1{}_nSi(R^2)_{4-n} \qquad (I)$$

hydrolyzate thereof and colloidal silica, wherein $R^1$ designates organic group containing hydrocarbon groups having 1 through 6 of carbon number, vinyl group, methacryloxy group, epoxy group, amino group, melcapto group, fluorine, or chlorine; $R^2$ designates either a single number or a plurality of bond group selected from alkoxy group, alkoxyalkoxy group and chlorine; n designates 0 through 4; and (ii) forming over the primary film of the organic substrate a secondary film of silicon dioxide containing an organic colorant by contacting the primary film coated organic substrate with processing solution prepared by adding the organic colorants such as dyestuffs or pigments, to hydrosilicofluoric acid solution supersaturated with silicon dioxide.

3. A method for coloring an organic substrate according to claim 2 wherein said organic silicon compound is comprised of at least one kind of silicon compounds containing amino group represented by general formula (II):

$$R^3{}_mSi(R^4)_{4-m} \qquad (II)$$

wherein $R^3$ designates organic group containing amino group, $R^4$ designates alkoxy group and m designates 1 or 2; and
at least one kind of silicon compounds represented by general formula (III):

$$R^5{}_lSi(R^6)_{4-l} \qquad (III)$$

wherein $R^5$ designates organic group containing hydrocarbon group having not more than 2 of carbon number such as methyl group or vinyl group, or hydroxyl group, $R^6$ designates alkoxyalkoxy group and l designates 1 or 2;
wherein blend ratio between the total molar concentration (A) of the silicon compound containing amino group represented by the general formula (II) and the total molar concentration (B) of the silicon compound represented by the general formula (III) satisfies the relationship of $0 \leq B/A < 10$.

4. A method for forming an organic substrate according to claim 2 wherein said organic silicon compound is comprised of silicon compounds containing methacryloxy group represented by general formula (IV):

$$R^7Si(R^8)_3 \qquad (IV)$$

wherein $R^7$ designates organic group containing methacryloxy group and $R^8$ designates either a kind or a plurality of complex groups selected from the group consisting of alkoxy group, alkoxyalkoxy group, acetoxy group and chlorine; and silicon compound represented by the general formula (V):

$$Si(R^9)_4 \qquad (V)$$

wherein $R^9$ designates either a kind or a plurality of complex groups selected from a group consisting of alkoxy group, alkoxyalkoxy group, acetoxy group and chlorine;

wherein blend ratio between the weight (C) converted into $R^7SiO_{3/2}$ from the silicon compound containing methacryloxy represented by the general formula (IV) and the weight (D) converted into $SiO_2$ from the hydrolyzed silicon compound represented by the general formula (V) satisfies the relationship of $0.1 < D/C$.

5. A method of coloring an organic substrate according to claim 2, 3, or 4 wherein an organic resin primer layer is formed over the surface of said organic substrate prior to forming the primary film.

6. A method for coloring an organic substrate according to claim 2, 3, or 4 wherein said hydrosilicofluoric acid solution supersaturated with silicon dioxide is prepared by adding an additive which reacts on fluorine ions such as boric acid, ammonia water, metal elements having greater ionization tendency than that of hydrogen, or metallic halogenide, to a hydrosilicofluoric acid solution saturated with dissolved silicon dioxide for supersaturation with silicon dioxide.

7. A method for coloring an organic substrate according to claim 2, 3, or 4 wherein said hydrosilicofluoric acid solution supersaturated with silicon dioxide is prepared by means of supersaturation with silicon dioxide which is dissolved at a low temperature for saturation and then, heated up to a high temperature.

8. A method for coloring an organic substrate according to claim 2, 3, or 4 wherein said organic colorant to be added to the hydrosilicofluoric acid solution supersaturated with silicon dioxide is provided in the form of a water solution or dissolved in a water soluble organic solvent.

9. A coloring method for acrylic resin substrate comprising steps of:
(i) forming a primary film by coating and curing organic silicon compound on the acrylic resin substrate; and
(ii) forming a secondary film of silicon dioxide on the acrylic resin substrate with primary film by contacting the substrate with hydrosilicofluoric acid solution supersaturated with silicon dioxide; wherein said primary film is formed by coating and curing mixture containing:
silicon compounds methacryloxy group represented by general formula (VI):

$$R^{11}Si(R^{12})_3 \qquad (VI)$$

wherein $R^{11}$ designates organic group containing methacryloxy group and $R^{12}$ designates either a kind or a plurality of bonded groups selected from a group consisting of alkoxy group, alkoxyalkoxy group, acetoxy group and chlorine;

hydrolyzate of silicon compound represented by formula (VII)

$$Si(R^{13})_4 \qquad (VII)$$

wherein $R^{13}$ designates either a kind or a plurality of bound group selected from the group consisting of alkoxy group, alkoxyalkoxy group, acetoxy group and chlorine;

wherein the mixture includes silicon compound containing methacryloxy group represented by the general formula (VI) and the hydrolyzate of silicon compound represented by the general formula (VII) so that the ratio between the weight (A) converted into $R^{11}SiO_{3/2}$ from the silicon compound containing the methacryloxy group represented by the general formula (VI) and the weight (B) converted into $SiO_2$ from the silicon compound represented by the general formula (VII) satisfies the relationship of $0.1 < B/A < 0.5$, and thereafter the silicon dioxide film containing organic colorant is formed on the primary layer by contacting the substrate with hydrosilicofluoric acid solution supersaturated with silicon dioxide added dyestuff or pigment.

10. A method for coloring an acrylic resin substrate according to claim 9 wherein said acrylic resin substrate has a number-average molecular weight of not more than 80,000.

11. A method for coloring an acrylic resin substrate according to claim 9 or 10 wherein said primary film is formed on a condition which forms 5 to 50 nm thickness film on a glass substrate if the condition is applied thereto.

12. A method for coloring an acrylic resin structure according to claim 9, or 10 wherein said primary film is formed by application of a coating liquid containing 0.3 to 3% by weight of the silicon compound.

13. A method for coloring an acrylic resin substrate according to claim 9, or 10 wherein said hydrosilicofluoric acid solution supersaturated with silicon dioxide is prepared by adding an additive which reacts on fluorine ions such as boric acid, ammonia water, metal elements having greater ionization tendency than that of hydrogen, or metallic halide, to a hydrosilicofluoric acid solution saturated with dissolved silicon dioxide for supersaturation with silicon dioxide.

14. A method for coloring an acrylic resin substrate according to claim 9, or 10 wherein said solution supersaturated with silicon dioxide is provided by means of supersaturation with silicon dioxide which is dissolved at a low temperature for saturation and then, heated and kept at a high temperature.

15. A method for coloring an acrylic resin substrate according to claim 9, or 10 wherein said organic colorant to be added to the hydrosilicofluoric acid solution supersaturated with silicon dioxide is provided in the form of a water solution or dissolved in a water soluble organic solvent.

16. A coloring method for polycarbonate substrate comprising steps of:

(i) forming a primary film by coating and curing organic silicon compound on the polycarbonate substrate; and (ii) forming a secondary film of silicon dioxide on the polycarbonate substrate with primary film by contacting the substrate with hydrosilicofluoric acid solution supersaturated with silicon dioxide; wherein said primary film is formed by coating and curing mixture containing:

at least of a kind of silicon compound selected from a group consisting of silicon compound and hydrolyzate thereof represented by general formula (VIII):

$$R_n^{21}Si(R^{22})_{4-n} \qquad (VIII)$$

wherein $R^{21}$ designates either hydrocarbon group containing not more than 2 of carbon number such as ethyl group or vinyl group, or organic group having not more than 3 of carbon number containing melcapto group, $R^{22}$ designates a kind or a plurality of bound group selected from a group consisting of alkoxy group, alkoxyalkoxy group, acetoxy group and chlorine, and n designates 0 or 1; and silicon compounds containing amino group;

wherein inclusion of silicon compound containing amino group is not less than 0.2% by weight and concentration of total silicon compound is not more than 5% by weight, and thereafter the silicon dioxide film containing organic colorant is formed on the primary layer by contacting the substrate with hydrosilicofluoric acid solution supersaturated with silicon dioxide added dyestuff or pigment.

17. A method for coloring a polycarbonate substrate according to claim 16 wherein said primary film is formed on a condition which forms of 5 to 100 nm thickness film on a glass substrate if the condition is applied thereto.

18. A method for coloring a polycarbonate substrate according to claim 16 or 17 wherein one or two of said silicon compound(s) containing amino group is/are selected from a group consisting of γ-aminopropyltriethoxysilane, N-(β-aminoethyl)-γ-aminopropyltrimethoxysilane and N-(β-aminoethyl)-γ-aminopropyldimethoxysilane.

19. A method for coloring a polycarbonate substrate according to claim 16, or 17 wherein said hydrosilicofluoric acid solution supersaturated with silicon dioxide is prepared by adding an additive which reacts on fluorine ions such as boric acid, ammonia water, metal elements having greater ionization tendency than hydrogen, or metallic halide, to a hydrosilicofluoric acid solution saturated with dissolved silicon dioxide for supersaturation with silicon dioxide.

20. A method for coloring a polycarbonate substrate according to claim 16, or 17 wherein said solution supersaturated with silicon dioxide is provided by means of supersaturation with silicon dioxide which is dissolved at a low temperature for saturation and then, heated and kept at a high temperature.

21. A method for coloring a polycarbonate substrate according to claim 16, 17, 18, 19 or 20 wherein said organic colorant to be added to the hydrosilicofluoric acid solution supersaturated with silicon dioxide is provided in the form of a water solution or dissolved in a water soluble organic solvent.

* * * * *